(12) United States Patent
Uemura et al.

(10) Patent No.: US 11,300,041 B2
(45) Date of Patent: Apr. 12, 2022

(54) TURBOCHARGER

(71) Applicant: KABUSHIKI KAISHA TOYOTA JIDOSHOKKI, Aichi-ken (JP)

(72) Inventors: Akihito Uemura, Aichi-ken (JP); Shuichi Fujita, Aichi-ken (JP); Toshiya Kato, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 134 days.

(21) Appl. No.: 16/822,142

(22) Filed: Mar. 18, 2020

(65) Prior Publication Data

US 2020/0309021 A1   Oct. 1, 2020

(30) Foreign Application Priority Data

Mar. 25, 2019 (JP) .............................. JP2019-056681

(51) Int. Cl.

| | |
|---|---|
| *F02B 37/02* | (2006.01) |
| *F01D 9/04* | (2006.01) |
| *F01D 15/08* | (2006.01) |
| *F01D 25/14* | (2006.01) |
| *F01D 9/02* | (2006.01) |
| *F01D 25/24* | (2006.01) |
| *F01D 25/26* | (2006.01) |

(52) U.S. Cl.
CPC ............. *F02B 37/025* (2013.01); *F01D 9/026* (2013.01); *F01D 9/048* (2013.01); *F01D 15/08* (2013.01); *F01D 25/145* (2013.01); *F01D 25/24* (2013.01); *F01D 25/26* (2013.01); *F05D 2230/54* (2013.01); *F05D 2240/126* (2013.01)

(58) Field of Classification Search
CPC ........ F01D 9/026; F01D 25/24; F01D 25/145; F01D 25/26; F02B 37/025

USPC ..... 417/373; 29/889.2; 415/214.1, 206, 200, 415/204, 177, 170.1
See application file for complete search history.

(56) References Cited

U.S. PATENT DOCUMENTS

| | | | |
|---|---|---|---|
| 2002/0085932 A1* | 7/2002 | Loffler | F01D 25/26 417/407 |
| 2015/0125275 A1* | 5/2015 | Ueda | F02B 37/24 415/158 |
| 2016/0290163 A1* | 10/2016 | Yokoyama | F01D 25/26 |

FOREIGN PATENT DOCUMENTS

| | | |
|---|---|---|
| JP | 2009-203803 | 9/2009 |
| WO | WO2015/097872 | 7/2015 |

* cited by examiner

*Primary Examiner* — Courtney D Heinle
*Assistant Examiner* — Andrew J Marien
(74) *Attorney, Agent, or Firm* — Greenblum & Bernstein, P.L.C.

(57) ABSTRACT

A turbocharger includes a first scroll member made of sheet metal, extending in a circumferential direction of an impeller shaft, having an opening that is opened to the bearing housing, and forming a part of a wall surface of the first turbine scroll passage, a second scroll member made of sheet metal, extending in the circumferential direction of the impeller shaft, having an opening that is opened to the bearing housing, and forming a part of a wall surface of the second turbine scroll passage, and a closing member closing the opening of the first scroll member and forming the wall surface of the first turbine scroll passage on the side thereof adjacent to the bearing housing, and closing the opening of the second scroll member and forming the wall surface of the second turbine scroll passage on the side thereof adjacent to the bearing housing.

8 Claims, 8 Drawing Sheets

TURBOCHARGER

CROSS-REFERENCE TO RELATED APPLICATION

This application claims priority to Japanese Patent Application No. 2019-056681 filed on Mar. 25, 2019, the entire disclosure of which is incorporated herein by reference.

BACKGROUND ART

The present disclosure relates to a turbocharger.

A housing of a turbocharger includes a bearing housing that rotatably supports an impeller shaft, a turbine housing that is connected to one end of the bearing housing and in which exhaust gas discharged from an internal combustion engine flows, and a compressor housing that is connected to the other end of the bearing housing and in which intake air to be introduced to the internal combustion engine flows.

A turbine chamber is formed in the turbine housing. The turbine chamber accommodates a turbine impeller that is connected to one end of the impeller shaft and that rotates integrally with the impeller shaft by exhaust gas introduced into the turbine chamber. In addition, a turbine scroll passage that is a part of a passage that guides the exhaust gas flowing into the turbine housing to the turbine chamber is formed in the turbine housing.

A compressor impeller that is connected to the other end of the impeller shaft and rotates integrally with the turbine impeller is accommodated in the compressor housing. When the turbine impeller is rotated by the exhaust gas discharged from the internal combustion engine and the compressor impeller rotates integrally with the turbine impeller via the impeller shaft, the intake air flowing through the compressor housing is compressed by the rotation of the compressor impeller, and such compressed intake air is supplied to the internal combustion engine. The intake efficiency of the internal combustion engine is enhanced and the performance of the internal combustion engine is improved by such supercharging of the intake air to the internal combustion engine by the turbocharger.

A catalyst purifying exhaust gas is disposed downstream of the turbine housing of the turbocharger in a direction in which the exhaust gas flows. Purification of exhaust gas by the catalyst is accomplished by increasing the temperature of the catalyst to its activation temperature or higher. In a case where the temperature of exhaust gas is low, the temperature of the catalyst may not increase to the activation temperature or higher, and thus exhaust gas may not be sufficiently purified.

In general, since it is necessary to ensure rigidity, the turbine housing is formed so as to have thick walls by casting, so that the turbine housing has a great mass and a great heat capacity. Thus, the heat of exhaust gas flowing through the turbine housing tends to reduce, thereby decreasing the temperature of the exhaust gas, while the exhaust gas flows through the turbine housing. As a result, it takes long to increase the temperature of the catalyst to the activation temperature or higher. This prevents increasing the temperature of the catalyst to the activation temperature or higher early when it is required to warm up the catalyst early, such as a cold start of the internal combustion engine.

International Publication No. WO 2015/097872 discloses a turbocharger in which a wall surface of a turbine scroll passage is formed by a passage forming plate of sheet metal. The passage forming plate suppresses the heat transfer from exhaust gas to the turbine housing. As a result, the temperature decrease of the exhaust gas while the exhaust gas flows through the turbine housing is suppressed.

In addition, the turbocharger of the above-cited Publication has a twin scroll structure in which a first turbine scroll passage and a second turbine scroll passage are formed. The first turbine scroll passage and the second turbine scroll passage extend annularly around the turbine chamber. In the internal combustion engine provided by a four cylinder engine, exhaust gas discharged from the first cylinder and fourth cylinder flows through the first turbine scroll passage, and exhaust gas discharged from the second cylinder and the third cylinder flows through the second turbine scroll passage. The turbocharger having twin scroll structure suppresses interference of pulsation of exhaust gas discharged from each cylinder. As a result, the performance of the turbocharger during the low speed operation may be improved. The wall surface of the first turbine scroll passage is formed by a first passage forming plate made of sheet metal. The wall surface of the second turbine scroll passage is formed by a part of the first passage forming plate different from a part thereof forming the first turbine scroll passage, and a second passage forming plate made of sheet metal.

However, the shape of the first passage forming plate becomes complex in a case where the wall surface of the first turbine scroll passage and a part of the wall surface of the second turbine scroll passage are formed by the first passage forming plate. This makes it difficult to form the first passage forming plate by press working.

The present disclosure is directed to providing a turbocharger in which a scroll structure can be easily formed.

SUMMARY

In accordance with an aspect of the present disclosure, there is provided a turbocharger including a housing including a bearing housing that rotatably supports an impeller shaft, and a turbine housing that is connected to one end of the bearing housing in a rotation axis direction of the impeller shaft and in which exhaust gas discharged from an internal combustion engine flows, a first inlet port through which the exhaust gas flows into the turbine housing, a second inlet port through which the exhaust gas flows into the turbine housing, a turbine chamber formed in the turbine housing, a turbine impeller accommodated in the turbine chamber, and rotating integrally with the impeller shaft by the exhaust gas flowing into the turbine chamber, a first turbine scroll passage that is formed in the turbine housing around a part of an outer periphery of the turbine chamber, and through which the exhaust gas flowing into the turbine housing through the first inlet port is introduced to the turbine chamber, a second turbine scroll passage that is formed in the turbine chamber around a part of the outer periphery of the turbine chamber and through which the exhaust gas flowing into the turbine housing through the second inlet port is introduced to the turbine chamber, and an annular communication passage that is formed in the turbine housing and provides communication between the first turbine scroll passage and the turbine chamber and between the second scroll passage with the turbine chamber. The turbocharger has a twin entry scroll structure in which the second turbine scroll passage communicates with the turbine chamber through a part of the communication passage that is different from a part of the communication passage through which the first turbine scroll communicates with the turbine chamber. The turbocharger includes a first scroll member, a second scroll member, and a closing member. The first scroll member is made of sheet metal, extends in a circumferential direction of the impeller shaft, has an opening that is opened to the bearing housing, and forms a part of a wall surface of the first turbine scroll passage. The second scroll member is made of sheet metal, extends in the circumferential direction of the impeller shaft, has an opening that is opened to the bearing housing, and forms a part of a wall surface of the second turbine scroll passage. The closing member closes the opening of the first scroll member and forms the wall surface of the first turbine scroll passage on the side thereof adjacent to the bearing housing, and closes the opening of the second scroll member and forms the wall surface of the second turbine scroll passage on the side thereof adjacent to the bearing housing.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure together with objects and advantages thereof may best be understood by reference to the following description of the presently preferred embodiments together with the accompanying drawings in which.

DETAILED DESCRIPTION OF THE EMBODIMENTS

The following will describe an embodiment of a turbocharger according to the present disclosure with reference to FIGS. 1 to 5.

Figure 1:
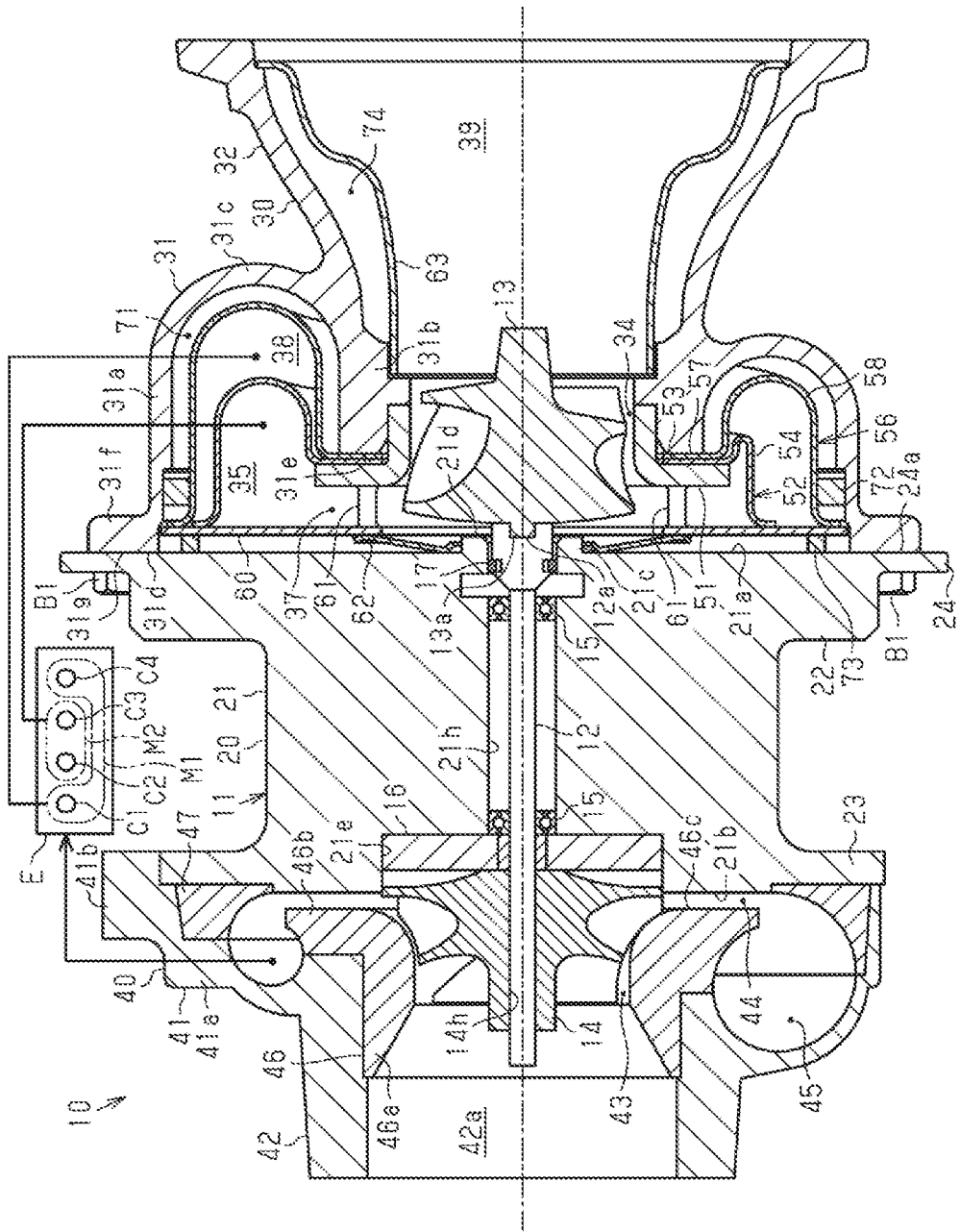
FIG. 1 is a side sectional view of a turbocharger according to an embodiment of the present disclosure.

FIG. 1 depicts a turbocharger 10 having a housing 11 that includes a bearing housing 20, a turbine housing 30, and a compressor housing 40. The bearing housing 20, the turbine housing 30, and the compressor housing 40 are made of cast iron. Exhaust gas discharged from an internal combustion engine E flows inside the turbine housing 30. Intake air to be led to the internal combustion engine E flows inside the compressor housing 40. The internal combustion engine E of the present embodiment is a four-cylinder engine in which first, second, third, fourth cylinders C1, C2, C3, C4 are arranged in series. Combustion takes place in the first cylinder C1, the third cylinder C3, the fourth cylinder C4, and the second cylinder C2 in this order. A first exhaust manifold M1 is connected to the first cylinder C1 and the fourth cylinder C4, and a second exhaust manifold M2 is connected to the second cylinder C2 and the third cylinder C3.

The bearing housing 20 rotatably supports an impeller shaft 12. A turbine impeller 13 is connected to one end of the impeller shaft 12 in the rotation axis direction of the impeller shaft 12. Specifically, the impeller shaft 12 has a fitting recess 12a that is formed in one end surface in the rotation axis direction of the impeller shaft 12, and the turbine impeller 13 has a fitting projection 13a that is formed extending toward the impeller shaft 12 and may be fitted to the fitting recess 12a of the impeller shaft 12. With the fitting projection 13a of the turbine impeller 13 fitted to the fitting recess 12a of the impeller shaft 12, the turbine impeller 13 is attached to the impeller shaft 12 by welding or the like so that the turbine impeller 13 is rotatable integrally with the impeller shaft 12. A compressor impeller 14 is connected to the other end of the impeller shaft 12 in the rotation axis direction of the impeller shaft 12.

The turbine housing 30 is connected to one end of the bearing housing 20 in the rotation axis direction of the impeller shaft 12. The compressor housing 40 is connected to the other end of the bearing housing 20 in the rotation axis direction of the impeller shaft 12.

The bearing housing 20 includes a bearing housing body portion 21 having a tubular shape. The bearing housing body portion 21 has an insertion hole 21h through which the impeller shaft 12 is inserted. The bearing housing body portion 21 rotatably supports the impeller shaft 12 inserted through the insertion hole 21h via a radial bearing 15. The axial direction of the bearing housing body portion 21 coincides with the rotation axis direction of the impeller shaft 12.

The bearing housing body portion 21 has a projection 21c that has a tubular shape and protrudes from one end surface 21a located at the one end of the bearing housing body portion 21 in the rotation axis direction of the impeller shaft 12. The insertion hole 21h is opened at an end surface 21d of the projection 21c. A C-ring 17 is interposed between the inner peripheral surface of the insertion hole 21h and the outer peripheral surface of the impeller shaft 12. The C-ring 17 serves as a sealing member. The bearing housing body portion 21 has a recessed portion 21e that is formed recessed in the other end surface 21b located in the other end of the bearing housing body portion 21 in the rotation axis direction of the impeller shaft 12. The insertion hole 21h is opened at the bottom surface of the recessed portion 21e. The diameter of the recessed portion 21e is greater than that of the insertion hole 21h. The axis of the recessed portion 21e coincides with the axis of the insertion hole 21h. A thrust bearing 16 is accommodated in the recessed portion 21e. The thrust bearing 16 is accommodated in the recessed portion 21e in contact with the bottom surface of the recessed portion 21e.

The bearing housing 20 includes a first flange portion 22 that projects outwardly in the radial direction of the impeller shaft 12 from one end of the outer peripheral surface of the bearing housing body portion 21 in the axial direction thereof, and a second flange portion 23 that projects outwardly in the radial direction of the impeller shaft 12 from the other end of the outer peripheral surface of the bearing housing body portion 21 in the axial direction thereof. The first flange portion 22 and the second flange portion 23 have a ring shape. A projected section 24 having a ring shape that projects outward in the radial direction is formed at the end of the outer peripheral surface of the first flange portion 22 opposite from the second flange portion 23. The projected section 24 has an end surface 24a that is located opposite from the second flange portion 23 and is continuous with the one end surface 21a of the bearing housing body portion 21.

The compressor housing 40 has a compressor housing body portion 41 having a bottomed cylindrical shape. The compressor housing body portion 41 has a bottom wall 41a having a substantially disc-shape and a cylindrical peripheral wall 41b formed extending from the periphery of the bottom wall 41a in the rotation axis direction of the impeller shaft 12. One end surface of the peripheral wall 41b opposite from the bottom wall 41a is opened. The compressor housing 40 is connected to the other end of the bearing housing 20 in the rotation axis direction of the impeller shaft 12 with the end of the peripheral wall 41b of the compressor housing 40 having an opening and the second flange portion 23 of the bearing housing 20 fixed by bolts (not shown). The opening of the peripheral wall 41b is closed by the other end surface 21b of the bearing housing body portion 21 and the end surface of the second flange portion 23 located opposite from the first flange portion 22. In other words, the opening of the peripheral wall 41b is closed by the end surface of the bearing housing 20 located at the other end of the bearing housing 20 in the rotation axis direction of the impeller shaft 12.

The compressor housing 40 further has a compressor tubular portion 42 projecting opposite side of the bottom wall 41a from the peripheral wall 41b. The compressor tubular portion 42 has an intake port 42a. The intake port 42a extends in the rotation axis direction of the impeller shaft 12. The axis of the intake port 42a coincides with the rotation axis of the impeller shaft 12.

A compressor impeller chamber 43, a diffuser passage 44, and a compressor scroll passage 45 are formed in the compressor housing 40. The compressor impeller chamber 43 is in communication with the intake port 42a, and accommodates the compressor impeller 14. The compressor scroll passage 45 is formed extending around the outer periphery of the compressor impeller chamber 43 in a swirl shape. The diffuser passage 44 extends around the compressor impeller chamber 43 in an annular shape, and provides communication between the compressor impeller chamber 43 and the compressor scroll passage 45.

A compressor shroud 46 having a tubular shape is disposed in the compressor housing 40. The compressor shroud 46 includes a tubular portion 46a extending along the inner peripheral surface of the compressor tubular portion 42, and a ring portion 46b that is formed continuous with the tubular portion 46a, extending along the inner bottom surface of the bottom wall 41a in an annular shape. The compressor impeller chamber 43 is a space surrounded by the tubular portion 46a of the compressor shroud 46 and the recessed portion 21e of the bearing housing 20.

The compressor impeller 14 has a shaft insertion hole 14h that extends in the rotation axis direction of the impeller shaft 12 and through which the impeller shaft 12 is inserted. The other end of the impeller shaft 12 in the rotation axis direction thereof projects out in the compressor impeller chamber 43. The compressor impeller 14 is attached to the impeller shaft 12 by a nut (not shown) or the like so as to be rotatable integrally with the impeller shaft 12 with a portion of the impeller shaft 12 projecting out in the compressor impeller chamber 43 inserted into the shaft insertion hole 14h. An end of the compressor impeller 14 on the bearing housing 20 side is supported by the thrust bearing 16 via a seal ring collar and a thrust collar (neither shown). The thrust bearing 16 receives a load in the thrust direction acting on the compressor impeller 14.

The ring portion 46b of the compressor shroud 46 has a surface 46c facing the bearing housing 20, which is a flat surface extending in the radial direction of the impeller shaft 12. The diffuser passage 44 is formed between the surface 46c of the ring portion 46b and a part of the end surface of the bearing housing 20 that is located at the other end in the rotation axis direction of the impeller shaft 12 and facing the surface 46c of the ring portion 46b in the rotation axis direction of the impeller shaft 12.

A compressor scroll member 47 having an annular shape is disposed in the compressor housing 40. The compressor scroll member 47 extends around the compressor shroud 46. The compressor scroll passage 45 is formed by the outer peripheral surface of the ring portion 46b of the compressor shroud 46, the inner bottom surface of the bottom wall 41a of the compressor housing body portion 41, and the inner peripheral surface of the compressor scroll member 47. It is noted that the compressor scroll member 47 and the compressor shroud 46 need not be necessarily formed separately from the compressor housing 40, but may be formed integrally with the compressor housing 40.

Figure 2:
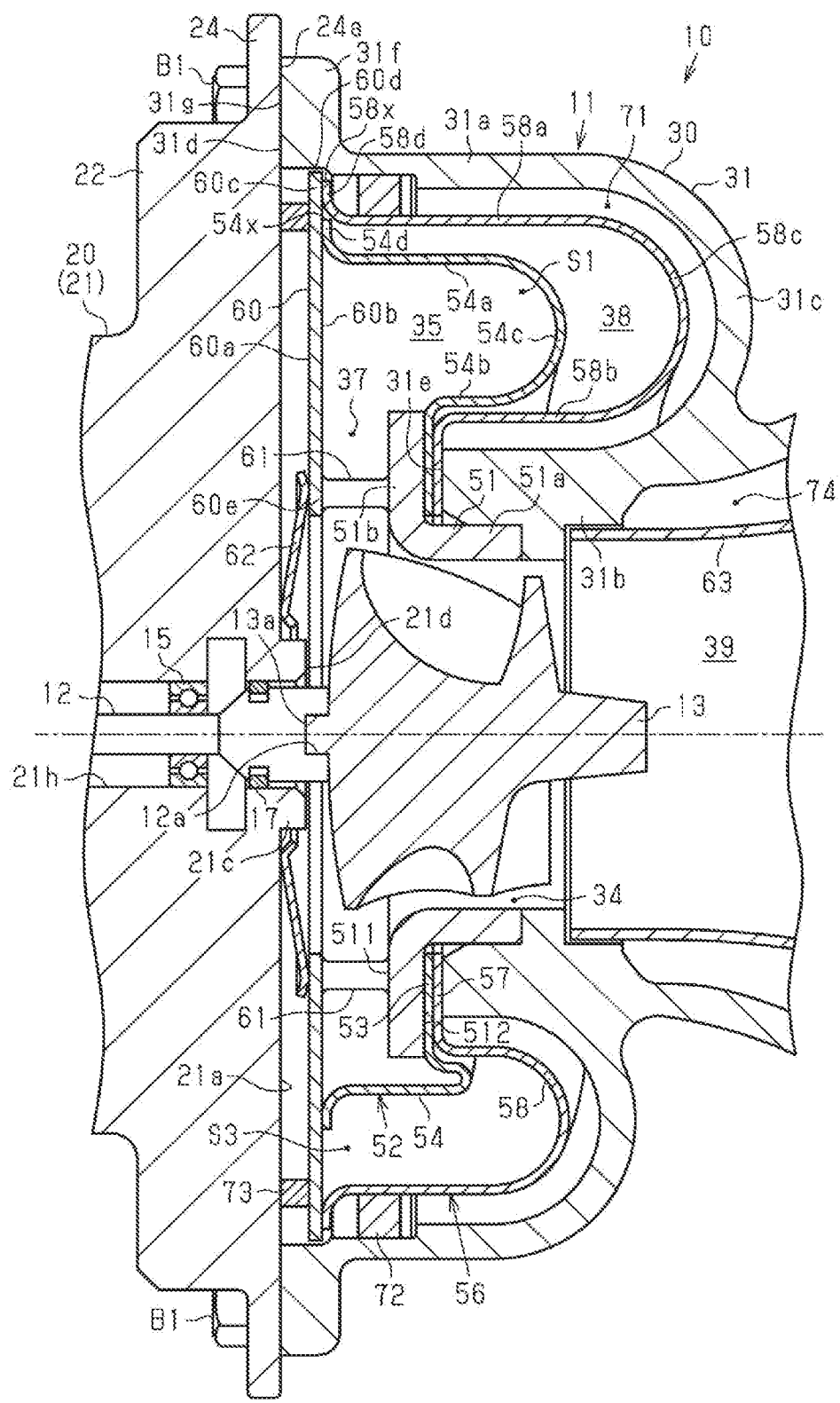
FIG. 2 is a partially enlarged view of the turbocharger of FIG. 1.
Figure 3:
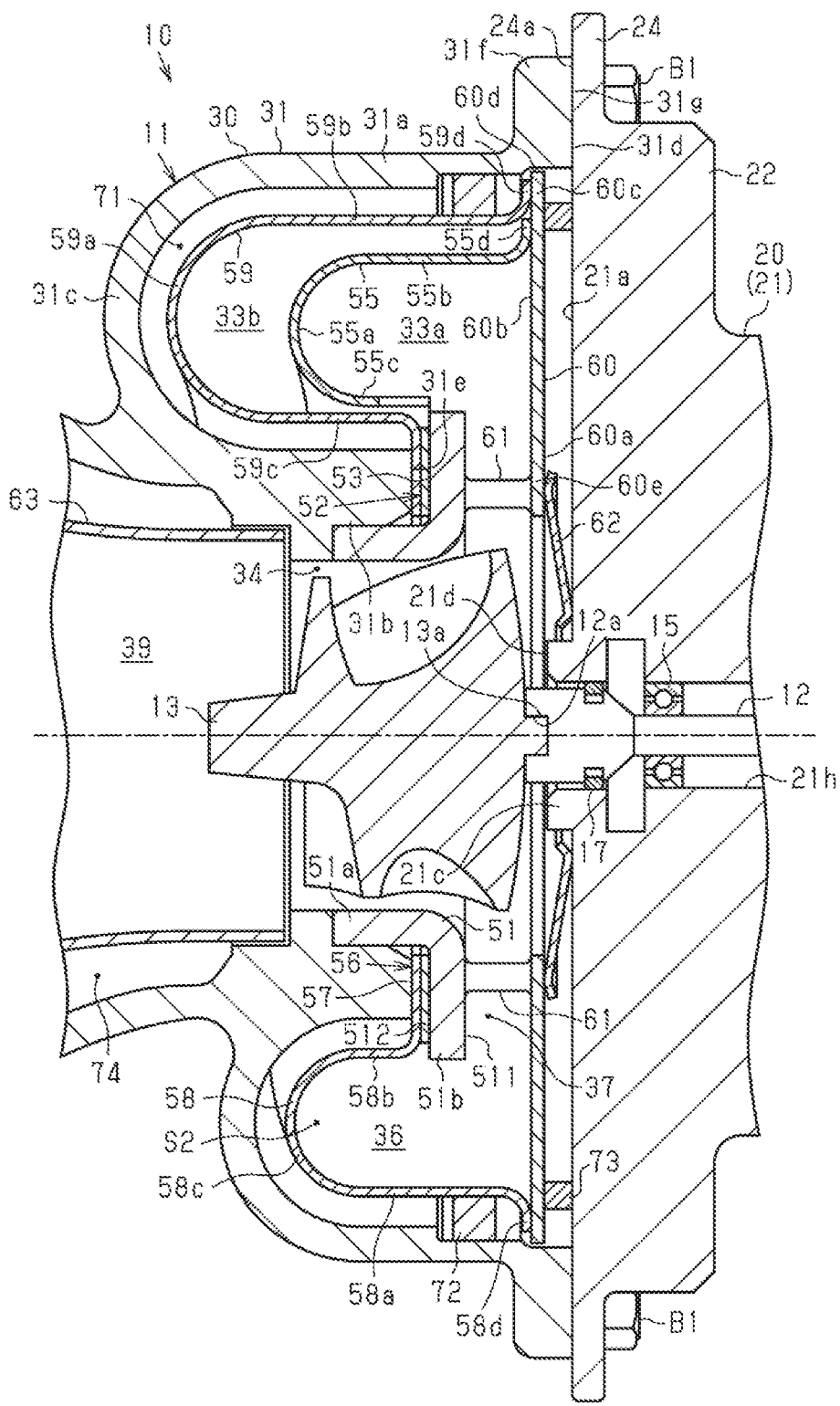
FIG. 3 is an enlarged sectional view of the turbocharger of the embodiment.

As shown in FIGS. 2 and 3, the turbine housing 30 has a turbine housing body portion 31 having an annular shape surrounding the turbine impeller 13. The turbine housing body portion 31 has an outer peripheral wall 31a, an inner peripheral wall 31b, and a connecting wall 31c. The outer peripheral wall 31a and the inner peripheral wall 31b extend in the rotation axis direction of the impeller shaft 12. The inner peripheral wall 31b is located inward of the outer peripheral wall 31a in the radial direction of the impeller shaft 12. The connecting wall 31c connects an end of the outer peripheral wall 31a located on the side thereof opposite from the bearing housing 20 in the rotation axis direction of the impeller shaft 12 and an end of the inner peripheral wall 31b located on the side thereof opposite from the bearing housing 20 in the rotation axis direction of the impeller shaft 12, in the radial direction of the impeller shaft 12. The connecting wall 31c has a curved in an arc, which is convex away from the bearing housing 20. The surface of the turbine housing body portion 31 opposite from the connecting wall 31c has an opening. In other words, the turbine housing body portion 31 is opened to the bearing housing 20.

The outer peripheral wall 31a has an end surface 31d that is located on the side thereof that is adjacent to the bearing housing 20 in the rotation axis direction of the impeller shaft 12. The inner peripheral wall 31b has an end surface 31e that is located on the side thereof that is adjacent to the bearing housing 20 in the rotation axis direction of the impeller shaft 12. The end surface 31d of the outer peripheral wall 31a projects further than the end surface 31e of the inner peripheral wall 31b toward the bearing housing 20 in the rotation axis direction of the impeller shaft 12. A flange 31f is formed in the outer peripheral surface of the outer peripheral wall 31a at an end thereof that is opposite from the connecting wall 31c. The flange 31f has a ring shape projecting radially outwardly from the outer peripheral surface of the outer peripheral wall 31a. An end surface 31g of the flange 31f located on the side thereof that is opposite from the connecting wall 31c is formed continuously with the end surface 31d of the turbine housing body portion 31.

The turbine housing 30 includes a turbine tubular portion 32, extending from the inner peripheral wall 31b of the turbine housing body portion 31 in a direction opposite from the bearing housing 20. The turbine tubular portion 32 has a shape whose diameter increases as separated away from the bearing housing 20. An end of the turbine tubular portion 32 opposite from the turbine housing body portion 31 is connected to a downstream exhaust pipe (not shown). The downstream exhaust pipe connects between the turbocharger 10 and a catalyst (not shown) disposed downstream of the turbine housing 30 in a direction in which exhaust gas flows. The catalyst purifies exhaust gas. Increasing the temperature of the catalyst to its activation temperature or higher, the catalyst purifies exhaust gas.

The turbine housing 30 is connected to the one end of the bearing housing 20 in the rotation axis direction of the impeller shaft 12 by fixing the flange 31f and the projected section 24 with bolts B1 in a state that the end surface 31g of the flange 31f of the turbine housing body portion 31 and the end surface 24a of the projected section 24 of the bearing housing 20 are in contact with each other.

As shown in FIG. 3, a first inlet port 33a and a second inlet port 33b are formed in the turbine housing 30 to introduce exhaust gas discharged from the internal combustion engine E into the turbine housing 30. The first inlet port 33a is connected to the second exhaust manifold M2, and the second inlet port 33b is connected to the first exhaust manifold M1. A turbine chamber 34 is formed in the turbine housing 30. The turbine impeller 13 is accommodated in the turbine chamber 34.

As shown in FIGS. 2 and 3, the turbine housing 30 has a first turbine scroll passage 35 through which exhaust gas flowing into the turbine housing 30 from the first inlet port 33a is introduced to the turbine chamber 34, and a second turbine scroll passage 36 through which exhaust gas flowing into the turbine housing 30 from the second inlet port 33b is introduced to the turbine chamber 34. The first turbine scroll passage 35 and the second turbine scroll passage 36 are formed around the outer periphery of the turbine chamber 34, respectively. The first turbine scroll passage 35 surrounds about a half of the circumference of the turbine chamber 34 in the circumferential direction of the impeller shaft 12. In other words, the first turbine scroll passage is formed in the turbine housing 30 around a part of the outer periphery of the turbine chamber 34. The second turbine scroll passage 36 surrounds about a half of the circumference of the turbine chamber 34 in the circumferential direction of the impeller shaft 12 where it is not surrounded by the first turbine scroll passage 35. In other words, second turbine scroll passage 36 is formed in the turbine housing 30 around a part of the outer periphery of the turbine chamber 34.

A communication passage 37 having an annular shape is formed in the turbine housing 30. The communication passage 37 provides communication between the first turbine scroll passage 35 and the turbine chamber 34, and also between the second turbine scroll passage 36 and the turbine chamber 34. The communication passage 37 surrounds the entire circumference of the turbine chamber 34. In the radial direction of the impeller shaft 12, the communication passage 37 is located between the turbine chamber 34 and the first turbine scroll passage 35 or between the turbine chamber 34 and the second turbine scroll passage 36. About a half of the communication passage 37 in the circumferential direction thereof communicates with the first turbine scroll passage 35, and the remaining half of the communication passage 37 communicates with the second turbine scroll passage 36. Thus, the first turbine scroll passage 35 is in communication with the turbine chamber 34 through about the half of the communication passage 37 in the circumferential direction thereof, and the second turbine scroll passage 36 is in communication with the turbine chamber 34 through the remaining half of the communication passage 37 in the circumferential direction thereof. In other words, the second turbine scroll passage 36 communicates with the turbine chamber 34 through a part of the communication passage 37 that is different from a part of the communication passage 37 through which the first turbine scroll passage 35 communicates with the turbine chamber 34. Thus, the turbocharger 10 has a twin entry scroll structure.

As shown in FIG. 2, the turbine housing 30 has a connecting passage 38 through which the second inlet port 33b and the second turbine scroll passage 36 are in communication with each other. The connecting passage 38 is formed around the outer periphery of the turbine chamber 34. The connecting passage 38 surrounds about a half circumference of the turbine chamber 34 where it is surrounded by the first turbine scroll passage 35. Thus, the connecting passage 38 extends along the first turbine scroll passage 35. The turbine housing 30 has an outlet port 39 through which exhaust gas flowing through the turbine chamber 34 is discharged to the outside the turbine housing 30.

A turbine shroud portion 51 is provided in the turbine housing 30. The turbine shroud portion 51 includes a tubular portion 51a extending along the outer surface of the inner peripheral wall 31b of the turbine housing body portion 31 opposite from the outer peripheral wall 31a, and a ring portion 51b extending in an annular shape along the end surface 31e of the turbine housing body portion 31 while continuing to the tubular portion 51a.

Figure 4:
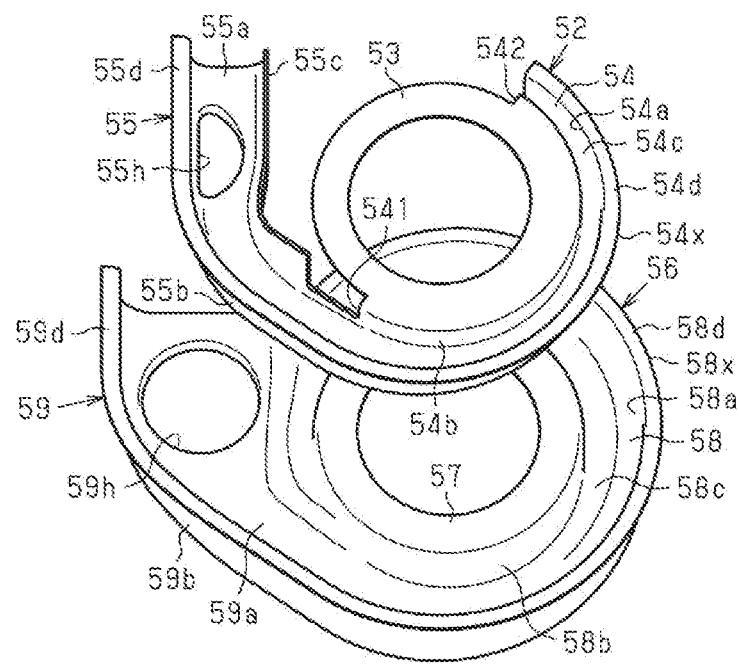
FIG. 4 is a perspective exploded view of a first scroll member and a second scroll member.
Figure 5:
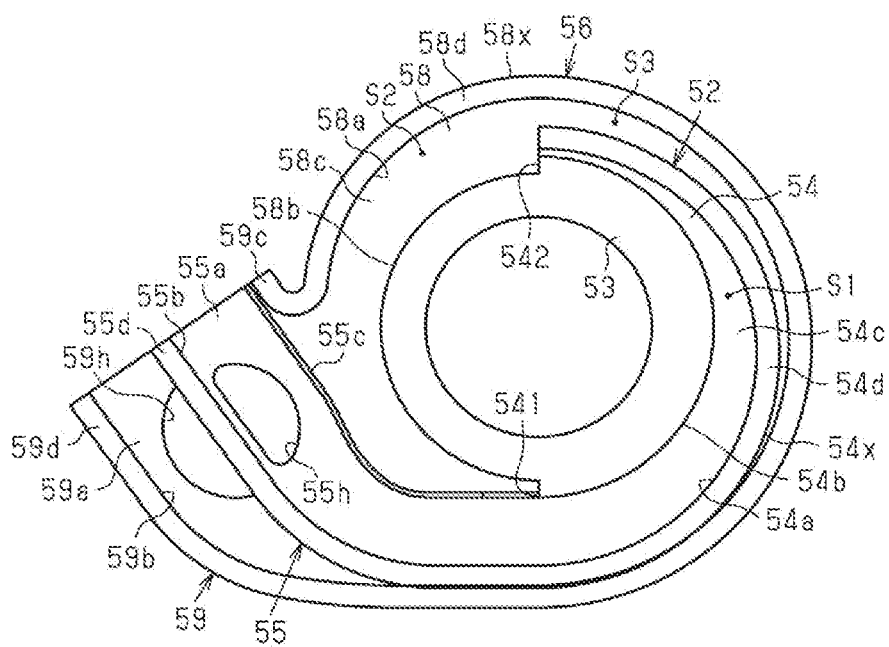
FIG. 5 is a front view showing the first scroll member and the second scroll member.

As shown in FIGS. 4 and 5, the turbocharger 10 includes a first scroll member 52 made of sheet metal. The thickness of the first scroll member 52 is smaller than that of the turbine housing 30. The first scroll member 52 is formed by pressing a metal sheet. The first scroll member 52 has a first ring part 53 and a first passage forming part 54 that is continuous with the outer peripheral edge of the first ring part 53 and is located outward of the first ring part 53. As shown in FIGS. 2 and 3, the first ring part 53 has a flat plate shape extending in the radial direction of the impeller shaft 12. The first ring part 53 is an inner peripheral end portion of the first scroll member 52.

The first passage forming part 54 is formed extending over the half of the first ring part 53 in the circumferential direction thereof. The first passage forming part 54 includes a first outer peripheral portion 54a, a first inner peripheral portion 54b, and a first connecting portion 54c. The first outer peripheral portion 54a and the first inner peripheral portion 54b extend in the rotation axis direction of the impeller shaft 12. The first inner peripheral portion 54b is located inward of the first outer peripheral portion 54a. The first connecting portion 54c connects an end of the first outer peripheral portion 54a opposite from the bearing housing 20 in the rotation axis direction of the impeller shaft 12 and an end of the first inner peripheral portion 54b opposite from the bearing housing 20 in the rotation axis direction of the impeller shaft 12. In other words, the first connecting portion 54c connects the first outer peripheral portion 54a and the first inner peripheral portion 54b in a radial direction of the impeller shaft 12. The first connecting portion 54c has a curved in an arc, which is convex away from the bearing housing 20. A surface of the first passage forming part 54 opposite from the first connecting portion 54c is opened. In other words, the first passage forming part 54 is opened to the bearing housing 20. A first rib 54d is formed at the end of the first outer peripheral portion 54a opposite from the first connecting portion 54c. The first rib 54d projects radially outwardly. The first rib 54d is an outer peripheral end portion of the first scroll member 52, and the tip end portion 54x of the first rib 54d is an outer peripheral side edge portion of the first scroll member 52.

As shown in FIG. 5, the distance from the first outer peripheral portion 54a to the first inner peripheral portion 54b in the radial direction of the first ring part 53 reduces toward the other end 542 from the one end 541 in the circumferential direction of the first passage forming part 54. In addition, the distance from the first rib 54d to the first connecting portion 54c in the rotation axis direction of the impeller shaft 12 reduces toward the other end 542 from the one end 541 in the circumferential direction of the first passage forming part 54.

The turbocharger 10 includes a first inlet port forming member 55 that has a half cylindrical shape, and is formed integrally with the first scroll member 52. The first inlet port forming member 55 includes a first bottom portion 55a that is continuous with the first connecting portion 54c at the one end 541 of the first passage forming part 54 in the circumferential direction thereof. The first bottom portion 55a has a first through hole 55h having a semicircular shape. The first inlet port forming member 55 includes a first outer wall 55b that is formed standing from one edge of the first bottom portion 55a and continuous with the first outer peripheral portion 54a, and a first inner wall 55c that is formed standing from the other edge of the first bottom portion 55a that is opposite from the one edge from which the first outer wall 55b that is formed standing and continuous with the first inner peripheral portion 54b. The first inner wall 55c has a recess that is recessed toward the first bottom portion 55a in a part of one end of the first inner wall 55c opposite from the first bottom portion 55a at a position adjacently to the first inner peripheral portion 54b. A surface of the first inlet port forming member 55 opposite from the first bottom portion 55a is opened. In other words, the first inlet port forming member 55 is opened to the bearing housing 20. The first outer wall 55b has a first rib section 55d at an end opposite from the first bottom portion 55a that projects in a direction away from the first inner wall 55c and formed continuously with the first rib 54d.

As shown in FIGS. 4 and 5, the turbocharger 10 includes a second scroll member 56 made of sheet metal. The thickness of the second scroll member 56 is smaller than that of the turbine housing 30. The second scroll member 56 is formed by pressing a metal sheet. The second scroll member 56 has a second ring part 57 and a second passage forming part 58 that is continuous with the outer peripheral edge of the second ring part 57 and is located outward of the second ring part 57. The second passage forming part 58 has an annular shape. As shown in FIGS. 2 and 3, the second ring part 57 has a plate shape extending in the radial direction of the impeller shaft 12. The second ring part 57 is an inner peripheral end portion of the second scroll member 56.

The second passage forming part 58 includes a second outer peripheral portion 58a, a second inner peripheral portion 58b, and a second connecting portion 58c. The second outer peripheral portion 58a and the second inner peripheral portion 58b extend in the rotation axis direction of the impeller shaft 12. The second inner peripheral portion 58b is located inward of the second outer peripheral portion 58a. The second connecting portion 58c connects an end of the second outer peripheral portion 58a opposite from the bearing housing 20 in the rotation axis direction of the impeller shaft 12 and an end of the second inner peripheral portion 58b opposite from the bearing housing 20 in the rotation axis direction of the impeller shaft 12. In other words, the second connecting portion 58c connects the second outer peripheral portion 58a and the second inner peripheral portion 58b in the radial direction of the impeller shaft 12. The second connecting portion 58c has a shape curved in an arc, which is convex away from the bearing housing 20. The second inner peripheral portion 58b and the second connecting portion 58c are formed extending the entire circumference around the second ring part 57, and the second outer peripheral portion 58a extends the three quarter around the second ring part 57. In other words, the second outer peripheral portion 58a is not formed in a part of the circumference of the second passage forming part 58. A surface of the second passage forming part 58 opposite from the second connecting portion 58c is opened. In other words, the second passage forming part 58 is opened to the bearing housing 20. A second rib 58d is formed at the end of the second outer peripheral portion 58a opposite from the second connecting portion 58c. The second rib 58d projects radially outwardly. The second rib 58d is an outer peripheral end portion of the second scroll member 56, and the tip end portion 58x of the second rib 58d is an outer peripheral side edge portion of the second scroll member 56.

The distance from the second outer peripheral portion 58a to the second inner peripheral portion 58b in the radial direction of the second ring part 57 is always greater than the distance from the first outer peripheral portion 54a to the first inner peripheral portion 54b in the radial direction of the first ring part 53. The distance from the second rib 58d to the second connecting portion 58c in the rotation axis direction of the impeller shaft 12 gradually reduces along the second ring part 57. The distance from the second rib 58d to the second connecting portion 58c in the rotation axis direction of the impeller shaft 12 is always greater than the distance from the first rib 54d to the first connecting portion 54c.

The turbocharger 10 includes a second inlet port forming member 59 that has a half cylindrical shape, and is formed integrally with the second scroll member 56. The second inlet port forming member 59 includes a second bottom portion 59a that is continuous with the second connecting portion 58c in the circumferential direction of the second passage forming part 58. The second bottom portion 59a has a second through hole 59h having a circular shape. The second inlet port forming member 59 includes a second outer wall 59b that is formed standing from one edge of the second bottom portion 59a, and a second inner wall 59c that is formed standing from the other edge of the second bottom portion 59a on the side opposite from the edge from which the second outer wall 59b is formed standing. The second outer wall 59b is continuous with one end of the second outer peripheral portion 58a in the circumferential direction thereof. The second inner wall 59c is continuous with a part of the second connecting portion 58c of the second passage forming part 58 where the second outer peripheral portion 58a is not formed, and a part of the second inner wall 59c is continuous with one end of the second rib 58d opposite from the second outer peripheral portion 58a in the circumferential direction thereof. A surface of the second inlet port forming member 59 opposite from the second bottom portion 59a is opened. In other words, the second inlet port forming member 59 is opened to the bearing housing 20. The second outer wall 59b has a second rib section 59d at an end opposite from the second bottom portion 59a that projects in a direction away from the second inner wall 59c and formed continuously with the second rib 58d. The second inlet port forming member 59 has a shape in which the distance between the second outer wall 59b and the second inner wall 59c becomes greater from the opening connected to the one end of the second outer peripheral portion 58a in the circumferential direction to the other opening. At a part where the distance between the second outer wall 59b and the second inner wall 59c is large, such distance is greater than the distance between the first outer wall 55b and the first inner wall 55c.

As shown in FIG. 2, the first scroll member 52 and the second scroll member 56 extend in the circumferential direction of the impeller shaft 12, respectively. The first passage forming part 54 extends in a swirl shape and outward of the turbine chamber 34 over a half circumference thereof in the circumferential direction of the impeller shaft 12. The second passage forming part 58 extends in a swirl shape and outward of the turbine chamber 34 over the entire circumference thereof in the circumferential direction of the impeller shaft 12.

The second passage forming part 58 of the second scroll member 56 is disposed in a space surrounded by the outer peripheral wall 31a, the inner peripheral wall 31b, and the connecting wall 31c of the turbine housing body portion 31. A gap is formed between the inner surface of the outer peripheral wall 31a and the outer surface of the second outer peripheral portion 58a. A gap is formed between the inner surface of the inner peripheral wall 31b adjacent to the outer peripheral wall 31a and the outer surface of the second inner peripheral portion 58b. A gap is formed between the inner surface of the connecting wall 31c and the outer surface of the second connecting portion 58c, That is, the second passage forming part 58 of the second scroll member 56 is accommodated in the turbine housing body portion 31 with the second passage forming part 58 spaced from the turbine housing body portion 31. A space between the second passage forming part 58 and the turbine housing body portion 31 serves as a first heat insulation layer 71. The second ring part 57 of the second scroll member 56 overlaps the end surface 31e of the turbine housing body portion 31 in the rotation axis direction of the impeller shaft 12, The second rib 58d corresponds to a free end of the second scroll member 56. The tip end portion 58x of the second rib 58d is spaced from the outer peripheral wall 31a of the turbine housing body portion 31 in the radial direction of the impeller shaft 12. The outer peripheral wall 31a is a facing member that faces the tip end portion 58x of the second rib 58d. The tip end portion 58x of the second rib 58d corresponds to a free end edge portion.

The first passage forming part 54 of the first scroll member 52 is accommodated in a space surrounded by the second outer peripheral portion 58a, the second inner peripheral portion 58b, and the second connecting portion 58c of the second passage forming part 58 of the second scroll member 56. A gap is formed between the inner surface of the second outer peripheral portion 58a and the outer surface of the first outer peripheral portion 54a. A slight gap is formed between the inner surface of the second inner peripheral portion 58b adjacent to the second outer peripheral portion 58a and the outer surface of the first inner peripheral portion 54b. A gap is formed between the inner surface of the second connecting portion 58c and the outer surface of the first connecting portion 54c. Thus, the first passage forming part 54 of the first scroll member 52 is accommodated in the second passage forming part 58 with the first passage forming part 54 of the first scroll member 52 spaced from the second passage forming part 58 of the second scroll member 56. The first ring part 53 of the first scroll member 52 overlaps the second ring part 57 of the second scroll member 56 in the rotation axis direction of the impeller shaft 12. The first rib 54d corresponds to a free end of the first scroll member 52. In addition, the tip end portion 54x of the first rib 54d faces the second rib 58d of the second scroll member 56 with the tip end portion 54x spaced from the second rib 58d of the second scroll member 56 in the radial direction of the impeller shaft 12. The second rib 58d is a facing member that faces the tip end portion 54x of the first rib 54d. The tip end portion 54x of the first rib 54d is a free end edge portion.

As shown in FIG. 5, the first scroll member 52 lays on the second scroll member 56 so that the distance from the second rib 58d to the second connecting portion 58c in the rotation axis direction of the impeller shaft 12 gradually reduces from the one end 541 to the other end 542 of the first passage forming part 54 in the circumferential direction thereof. The first inlet port forming member 55 is accommodated in a space surrounded by the second bottom portion 59a, the second outer wall 59b, and the second inner wall 59c of the second inlet port forming member 59. At a part where the distance between the second outer wall 59b and the second inner wall 59c is large, the first inlet port forming member 55 is located adjacent to the second inner wall 59c, and the outer surface of the first outer wall 55b is spaced from the inner surface of the second outer wall 59b.

The first through hole 55h of the first inlet port forming member 55 is in communication with about the half of the second through hole 59h of the second inlet port forming member 59. The first through hole 55h and the second through hole 59h may be opened and closed by a valve (not shown). The valve closes the first through hole 55h and the second through hole 59h during the normal operation of the turbocharger 10. The valve reduces the amount of exhaust gas flowing into the turbine chamber 34 by opening the first through hole 55h and the second through hole 59h when there is a fear that the impeller shaft 12 may over-rotates in a case where excessive amount of exhaust gas flows into the turbine chamber 34.

As shown in FIGS. 2 and 3, a first elastic member 72 is interposed between the second outer peripheral portion 58a of the second passage forming part 58 and the outer peripheral wall 31a of the turbine housing body portion 31 in the radial direction of the impeller shaft 12. The first elastic member 72 has an annular shape, and is mounted on the second outer peripheral portion 58a of the second passage forming part 58. In the present embodiment, the first elastic member 72 is provided by a wire mesh, and is welded to the second outer peripheral portion 58a of the second passage forming part 58 by micro spot welding. The first elastic member 72 is disposed between the second outer peripheral portion 58a of the second passage forming part 58 and the outer peripheral wall 31a of the turbine housing body portion 31 in a state that is pressed and deformed. The second outer peripheral portion 58a of the second passage forming part 58 is supported by the turbine housing body portion 31 via the first elastic member 72.

The first ring part 53 of the first scroll member 52 and the second ring part 57 of the second scroll member 56 are disposed between the other end surface 512 of the ring portion 51b of the turbine shroud portion 51 located adjacent to the tubular portion 51a, and the end surface 31e of the turbine housing body portion 31 in the rotation axis direction of the impeller shaft 12.

The turbocharger 10 has a passage forming plate 60 having an annular shape and disposed between the bearing housing 20 and the first scroll member 52, and between the bearing housing 20 and the second scroll member 56 in the rotation axis direction of the impeller shaft 12. The passage forming plate 60 is made of sheet metal, and the thickness of the passage forming plate 60 is smaller than that of the turbine housing 30. The passage forming plate 60 is disposed outward of the turbine impeller 13 in the radial direction of the impeller shaft 12. The passage forming plate 60 covers an opening S1 of the first passage forming part 54, a part S2 of an opening of the second passage forming part 58 where it is not closed by the first passage forming part 54 and a gap S3 between the first outer peripheral portion 54a of the first passage forming part 54 and the second outer peripheral portion 58a of the second passage forming part 58, which are shown in FIGS. 2, 3, and 5, from the bearing housing 20 side. Thus, the passage forming plate 60 corresponds to a closing member that covers the opening of the first passage forming part 54 and the opening of the second passage forming part 58. In addition, as shown in FIG. 3, the passage forming plate 60 covers the opening of the first inlet port forming member 55 and the opening of the second inlet port forming member 59 from the bearing housing 20 side. The passage forming plate 60 includes a first end surface 60a, and a second end surface 60b. The first end surface 60a faces the one end surface 21a of the bearing housing body portion 21 of the bearing housing 20, and the second end surface 60b partially faces the first connecting portion 54c of the first passage forming part 54, the second connecting portion 58c of the second passage forming part 58, the first bottom portion 55a of the first inlet port forming member 55, and the second bottom portion 59a of the second inlet port forming member 59.

The passage forming plate 60 includes an outer peripheral end portion 60c that is disposed between the one end surface 21a of the bearing housing body portion 21 of the bearing housing 20 and the first rib 54d, and the between the one end surface 21a of the bearing housing body portion 21 of the bearing housing 20 and the second rib 58d. The outer peripheral end portion 60c of the passage forming plate 60 is spaced from the one end surface 21a of the bearing housing body portion 21, and in contact with the first rib 54d and the second rib 58d. Thus, the outer peripheral end portion 60c of the passage forming plate 60 is a free end. In addition, the passage forming plate 60 includes an outer peripheral edge portion 60d that faces the outer peripheral wall 31a of the turbine housing body portion 31 with a gap formed therebetween in the radial direction of the impeller shaft 12. In other words, the outer peripheral edge portion 60d of the passage forming plate 60 is spaced from the outer peripheral wall 31a of the turbine housing body portion 31.

A plurality of spacers 61 is interposed between an inner peripheral end portion 60e of the passage forming plate 60 and the ring portion 51b of the turbine shroud portion 51 in the rotation axis direction of the impeller shaft 12. The spacers 61 are arranged at predetermined intervals in the circumferential direction of the communication passage 37. The spacers 61 maintains a space between the one end surface 511 of the ring portion 51b of the turbine shroud portion 51 and the second end surface 60b of the passage forming plate 60 in the rotation axis direction of the impeller shaft 12.

A second elastic member 73 is interposed between the outer peripheral end portion 60c of the passage forming plate 60 and the bearing housing body portion 21 of the bearing housing 20 in the rotation axis direction of the impeller shaft 12. The second elastic member 73 is disposed at a position where the outer peripheral end portion 60c of the passage forming plate 60 is located in the radial direction of the impeller shaft 12. The second elastic member 73 has an annular shape and is attached to the first end surface 60a of the passage forming plate 60. In the present embodiment, the second elastic member 73 is provided by a wire mesh, and is welded to the first end surface 60a of the passage forming plate 60 by micro spot welding. The second elastic member 73 is disposed between the one end surface 21a of the bearing housing body portion 21 of the bearing housing 20 and the first end surface 60a of the passage forming plate 60 in a state that is pressed and deformed. The outer peripheral end portion 60c of the passage forming plate 60 is supported by the bearing housing 20 via the second elastic member 73.

A plate spring 62 having an annular shape is interposed between the first end surface 60a of the passage forming plate 60 and the one end surface 21a of the bearing housing body portion 21 of the bearing housing 20 in the rotation axis direction of the impeller shaft 12. The plate spring 62 is disposed inward of the first passage forming part 54 and the second passage forming part 58 in the radial direction of the impeller shaft 12. An inner peripheral part of the plate spring 62 is in contact with the one end surface 21a of the bearing housing body portion 21 of the bearing housing 20, and an inner peripheral edge of the plate spring 62 faces the outer peripheral surface of the projection 21c in the radial direction of the impeller shaft 12. An outer peripheral part of the plate spring 62 is in contact with part of the first end surface 60a of the passage forming plate 60 forming the inner peripheral end portion 60e.

The plate spring 62 is held between the bearing housing body portion 21 of the bearing housing 20 and the passage forming plate 60 in a state where the plate spring 62 is compressed in the rotation axis direction of the impeller shaft 12 with respect to the pre-deformed original shape. Thus, the plate spring 62 urges the inner peripheral end portion 60e of the passage forming plate 60 in a direction opposite from the bearing housing 20, that is, toward the spacer 61, by its reaction force to return to the pre-deformed original shape. Accordingly, the second ring part 57 of the second scroll member 56, the first ring part 53 of the first scroll member 52, the ring portion 51b of the turbine shroud portion 51, the spacer 61, and the inner peripheral end portion 60e of the passage forming plate 60 are pressed against the end surface 31e of the turbine housing body portion 31, and supported by end surface 31e. The first scroll member 52 and the second scroll member 56 are supported by the turbine housing 30 with the first ring part 53 and the second ring part 57 held between the other end surface 512 of the ring portion 51b of the turbine shroud portion 51 and the end surface 31e of the turbine housing body portion 31. Thus, the first ring part 53 is a fixed end in the first scroll member 52 and the second ring part 57 is a fixed end in the second scroll member 56. The inner peripheral end portion 60e of the passage forming plate 60 is held between the bearing housing body portion 21 of the bearing housing 20 and the spacer 61 via the plate spring 62.

The turbine chamber 34 is a space surrounded by the inner peripheral surface of the tubular portion 51a of the turbine shroud portion 51, the end surface 21d of the projection 21c, and the surface of the plate spring 62 on the passage forming plate 60 side. The communication passage 37 is a space formed between the one end surface 511 of the ring portion 51b of the turbine shroud portion 51 and a part of the second end surface 60b of the passage forming plate 60 forming the inner peripheral end portion 60e. Thus, the part of the second end surface 60b of the passage forming plate 60 forming the inner peripheral end portion 60e forms the wall surface of the communication passage 37 on the bearing housing 20 side, and the one end surface 511 of the ring portion 51b of the turbine shroud portion 51 forms the wall surface of the communication passage 37 on the side opposite from the bearing housing 20.

As shown in FIG. 3, the first inlet port 33a is a space surrounded by the inner surface of the first bottom portion 55a, the inner surface of the first outer wall 55b, the inner surface of the first inner wall 55c of the first inlet port forming member 55, and a part of the second end surface 60b of the passage forming plate 60 facing the first bottom portion 55a of the first inlet port forming member 55. The second inlet port 33b is a space surrounded by the outer surface of the first bottom portion 55a, the outer surface of the first outer wall 55b, the outer surface of the first inner wall 55c of the of the first inlet port forming member 55, the surface of the first rib section 55d facing the first bottom portion 55a, the inner surface of the second bottom portion 59a, the inner surface of the second outer wall 59b, the second inner wall 59c of the second inlet port forming member 59, and the second end surface 60b of the passage forming plate 60.

As shown in FIG. 2, the first turbine scroll passage 35 is a space surrounded by the inner surface of the first outer peripheral portion 54a of the first passage forming part 54, the inner surface of the first inner peripheral portion 54b, the inner surface of the first connecting portion 54c of the first passage forming part 54, and a part of the second end surface 60b of the passage forming plate 60 facing the first passage forming part 54. Thus, the passage forming plate 60 forms the wall surface of the first turbine scroll passage 35 on the bearing housing 20 side. The cross sectional area of the first turbine scroll passage 35 gradually reduces from an end thereof adjacent to the first inlet port 33a towards an end thereof adjacent to the turbine chamber 34 in the circumferential direction of the impeller shaft 12.

The connecting passage 38 is a space surrounded by the outer surface of the first passage forming part 54 of the first scroll member 52, the inner surface of the second passage forming part 58 of the second scroll member 56, and a part of the second end surface 60b of the passage forming plate 60 covering the gap S3 between the first outer peripheral portion 54a and the second outer peripheral portion 58a. The cross sectional area of the connecting passage 38 is constant from an end thereof adjacent to the second inlet port 33b toward and end thereof adjacent to the second turbine scroll passage 36 in the circumferential direction of the impeller shaft 12.

As shown in FIG. 3, the second turbine scroll passage 36 is a space surrounded by the inner surface of the second outer peripheral portion 58a, the inner surface of the second inner peripheral portion 58b, a part of the inner surface of the second connecting portion 58c of the second passage forming part 58 of the second scroll member 56 not facing the first scroll member 52, and a part of the second end surface 60b of the passage forming plate 60 facing the second scroll member 56. The cross sectional areal of the second turbine scroll passage 36 gradually reduces from an end thereof adjacent to the connecting passage 38 toward an end thereof adjacent to the turbine chamber 34 in the circumferential direction of the impeller shaft 12.

The turbocharger 10 includes an outlet port forming member 63 having a tubular shape that is disposed inside the turbine tubular portion 32 and forms a wall surface of the outlet port 39. The outlet port forming member 63 is made of sheet metal, and the thickness of the outlet port forming member 63 is smaller than that of the turbine housing 30. Thus, the passage forming plate 60 forms the wall surface of the second turbine scroll passage 36 on the bearing housing 20 side. The outer peripheral surface of the outlet port forming member 63 is spaced from the inner peripheral surface of the turbine tubular portion 32. A space between the outer peripheral surface of the outlet port forming member 63 and the inner peripheral surface of the turbine tubular portion 32 serves as the second heat insulation layer 74.

The following will describe the operation of the present embodiment.

Exhaust gas discharged from the second cylinder C2 and the third cylinder C3 of the internal combustion engine E through the second exhaust manifold M2 is led to the first turbine scroll passage 35 through the first inlet port 33a. The exhaust gas led to the first turbine scroll passage 35 is introduced into the turbine chamber 34 through the communication passage 37. Exhaust gas discharged from the first cylinder C1 and the fourth cylinder C4 of the internal combustion engine E through the first exhaust manifold M1 is led to the second turbine scroll passage 36 through the second inlet port 33b and the connecting passage 38. The exhaust gas led to the second turbine scroll passage 36 is introduced to the turbine chamber 34 through the communication passage 37. While the exhaust gas flows through the connecting passage 38 and the second turbine scroll passage 36, the first heat insulation layer 71 suppresses transfer of heat from the exhaust gas to the turbine housing body portion 31 of the turbine housing 30.

With the exhaust gas introduced into the turbine chamber 34, the turbine impeller 13 rotates. With the rotation of the turbine impeller 13, the compressor impeller 14 rotates integrally with the turbine impeller 13 via the impeller shaft 12. With the rotation of the compressor impeller 14, intake air introduced into the compressor impeller chamber 43 through the intake port 42a is compressed, which is decelerated while passing through the diffuser passage 44, and velocity energy of the intake air is converted to pressure energy. Then, the high-pressured intake air is discharged to the compressor scroll passage 45, and is supplied to the internal combustion engine E. Such supercharging of the intake air to the internal combustion engine E by the turbocharger 10 enhances the intake efficiency of the internal combustion engine E to thereby improve the performance of the internal combustion engine E. Exhaust gas flowing through the turbine chamber 34 flows out from the outlet port 39 and is led to the catalyst through the downstream exhaust pipe, and is purified by the catalyst. The second heat insulation layer 74 suppresses the heat transfer from the exhaust gas to the turbine tubular portion 32 of the turbine housing 30 while exhaust gas flowing through the outlet port 39.

The following will describe the effects of the present embodiment.

(1) Part of the wall surface of the first turbine scroll passage 35 is formed by the first scroll member 52 made of sheet metal, and part of the wall surface of the second turbine scroll passage 36 is formed by the second scroll member 56 made of sheet metal. The shapes of the first scroll member 52 and the second scroll member 56 may be simplified by providing a member forming the part of the wall surface of the first turbine scroll passage 35 and a member forming the part of the wall surface of the second turbine scroll passage 36, separately. This configuration facilitates manufacturing the first scroll member 52 and the second scroll member 56 by pressing. As a result, the scroll structure may be manufactured easily.

(2) The first scroll member 52 and the second scroll member 56 may be assembled by only placing the first passage forming part 54 of the first scroll member 52 in a space surrounded by the second outer peripheral portion 58a of the second passage forming part 58, the second inner peripheral portion 58b, and the second connecting portion 58c of the second scroll member 56.

(3) The connecting passage 38 is formed between the first connecting portion 54c of the first passage forming part 54 and the second connecting portion 58c of the second passage forming part 58, and is disposed side by side with the first turbine scroll passage 35 in the rotation axis direction of the impeller shaft 12. This configuration permits securing the cross sectional area of the connecting passage 38 in the rotation axis direction of the impeller shaft 12, so that the area of the connecting passage 38 where it is disposed side by side with the first turbine scroll passage 35 in the radial direction of the impeller shaft 12 may be small. Therefore, the turbocharger 10 may be downsized in the radial direction of the impeller shaft 12.

(4) The first scroll member 52 and the second scroll member 56 are supported by the turbine housing 30 with the first ring part 53 and the second ring part 57 held between the ring portion 51b of the turbine shroud portion 51 and the inner peripheral wall 31b of the turbine housing body portion 31. Therefore, the positional relationship between the first scroll member 52 and the second scroll member 56 may be determined without integrating the first scroll member 52 and the second scroll member 56 by welding.

(5) In the first scroll member 52, the first rib 54d is a free end, and the tip end portion 54x of the first rib 54d faces the second rib 58d of the second scroll member 56 in a state that the tip end portion 54x is spaced from the second rib 58d. This configuration allows the heat expansion of the first scroll member 52, which occurs when the first scroll member 52 is warmed by the heat of the exhaust gas flowing through the first turbine scroll passage 35. Similarly, in the second scroll member 56, the second rib 58d is a free end, and the tip end portion 58x of the second rib 58d faces the outer peripheral wall 31a of the turbine housing body portion 31 in a state that the tip end portion 58x is spaced from the outer peripheral wall 31a. This configuration allows the heat expansion of the second scroll member 56, which occurs when the second scroll member 56 is warmed by the heat of the exhaust gas flowing through the second turbine scroll passage 36 and the connecting passage 38. As a result, the deformation of the first scroll member 52 and the second scroll member 56, which may be caused by excessive stress locally acting on the first scroll member 52 and the second scroll member 56 may be suppressed.

(6) The twin entry structure of the turbocharger 10 suppresses the interference of the pulsation of the exhaust gas. As a result, the performance of the turbocharger 10 during the low speed operation may be improved.

(7) The surface roughness of the wall surface of the first turbine scroll passage 35 may be reduced by forming the wall surface of the first turbine scroll passage 35 by the first scroll member 52 made of sheet metal, as compared with the case where the wall surface of the first scroll member 52 is formed by the turbine housing 30 made of cast iron. Additionally, the surface roughness of the respective wall surfaces of the second turbine scroll passage 36 and the connecting passage 38 may be reduced by forming the wall surfaces of the second turbine scroll passage 36 and the connecting passage 38 by the second scroll member 56 made of sheet metal, as compared with the case where the wall surface of the second turbine scroll passage 36 and the connecting passage 38 is formed by the turbine housing 30 made of cast iron. This increases the efficiency of the turbocharger 10.

(8) The first heat insulation layer 71 is provided between the second passage forming part 58 of the second scroll member 56 and the turbine housing body portion 31. The provision of the first heat insulation layer 71 suppresses transfer of the heat of the exhaust gas flowing through the connecting passage 38 and the second turbine scroll passage 36 to the turbine housing body portion 31. Further, the second heat insulation layer 74 is provided between the outlet port forming member 63 and the turbine tubular portion 32. This permit using cast iron, which has inferior heat resistance but is lower in price than cast steel, as a material for the turbine housing 30. As a result, the manufacturing cost of the turbocharger 10 may be reduced.

The present embodiment may be modified in various manners, as exemplified below. The above-described embodiment and the modification may be implemented in combination with each other within the scope of the present disclosure.

The shapes of the first scroll member 52 and the second scroll member 56 may be modified into those shown in FIGS. 6 through 9.

Figure 6:
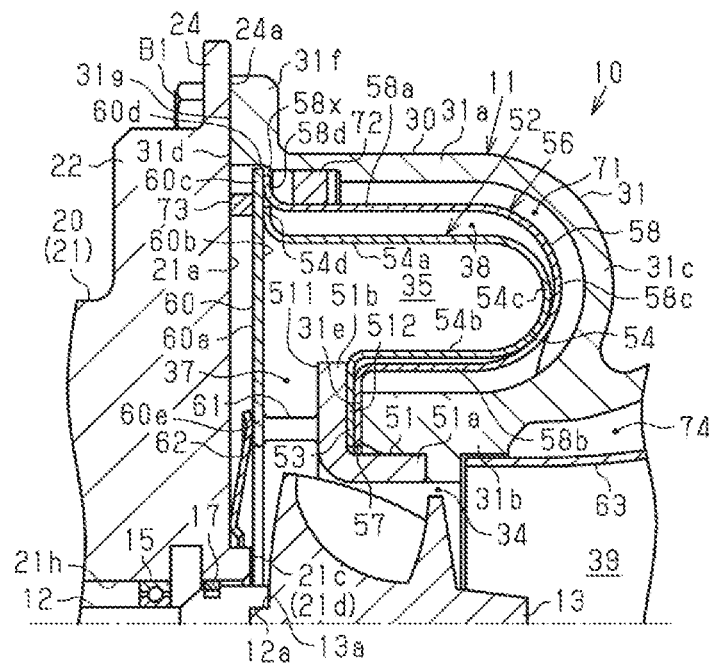
FIG. 6 is a side sectional view of an example of the turbocharger according to the present embodiment.

In FIG. 6, the outer surface of the first connecting portion 54c of the first scroll member 52 is in contact with the inner surface of the second connecting portion 58c of the second scroll member 56 in the rotation axis direction of the impeller shaft 12. It is noted that the shape of the second scroll member 56 shown in FIG. 6 is the same as the second scroll member 56 of the above-described embodiment. In this case, the connecting passage 38 is formed between the outer surface of the first outer peripheral portion 54a of the first scroll member 52 and the outer surface of the second outer peripheral portion 58a of the second scroll member 56, and between a radially outward part of the outer surface of the first connecting portion 54c and a radially outward part of the outer surface of the second connecting portion 58c. Thus, a large part of the connecting passage 38 is formed outward of the first turbine scroll passage 35 in the radial direction of the impeller shaft 12.

Figure 7:
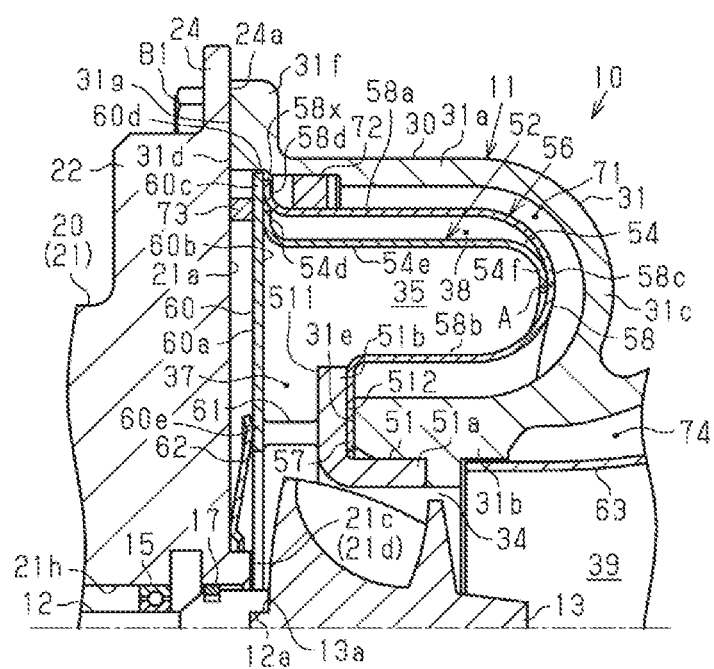
FIG. 7 is a side sectional view of an example of the turbocharger according to the present embodiment.

In FIG. 7, the first passage forming part 54 of the first scroll member 52 includes a peripheral wall portion 54e that extends in the rotation axis direction of the impeller shaft 12, a curved portion 54f that has a curved shape and is formed continuous with an end of the peripheral wall portion 54e opposite from the bearing housing 20. The peripheral wall portion 54e has a first rib 54d projecting outwardly in the radial direction of the impeller shaft 12 and in an end of the peripheral wall portion 54e adjacent to the bearing housing 20. It is noted that the shape of the second scroll member 56 shown in FIG. 7 is the same as the second scroll member 56 of the above-described embodiment.

The turbocharger 10 has a welded portion A where an end of the curved portion 54f of the first scroll member 52 opposite from the peripheral wall portion 54e and the radially central part of the second connecting portion 58c of the second scroll member 56 are welded. The first scroll member 52 and the second scroll member 56 are integrated together with the welded portion A. The first scroll member 52 and the second scroll member 56 are supported by the turbine housing 30 with the second ring part 57 held between the end surface 31e of the turbine housing body portion 31 and the other end surface 512 of the ring portion 51b of the turbine shroud portion 51.

Thus, the first turbine scroll passage 35 is a space surrounded by the inner surface of the second inner peripheral portion 58b of the second scroll member 56, the radially inner part of the inner surface of the second connecting portion 58c, the inner surface of the peripheral wall portion 54e of the first scroll member 52, the inner surface of the curved portion 54f, and the second end surface 60b of the passage forming plate 60. Since a part of the second scroll member 56 forms a part of the wall surface of the first turbine scroll passage 35, a part where the first scroll member 52 and the second scroll member 56 overlap is reduced, as compared with the above-described embodiment. As a result, the weight of the turbocharger 10 may be reduced. The connecting passage 38 is formed between the outer surface of the peripheral wall portion 54e of the first scroll member 52 and the inner surface of the second outer peripheral portion 58a of the second scroll member 56, and between the outer surface of the curved portion 54f of the first scroll member 52 and the inner surface of the second connecting portion 58c of the second scroll member 56.

Figure 8:
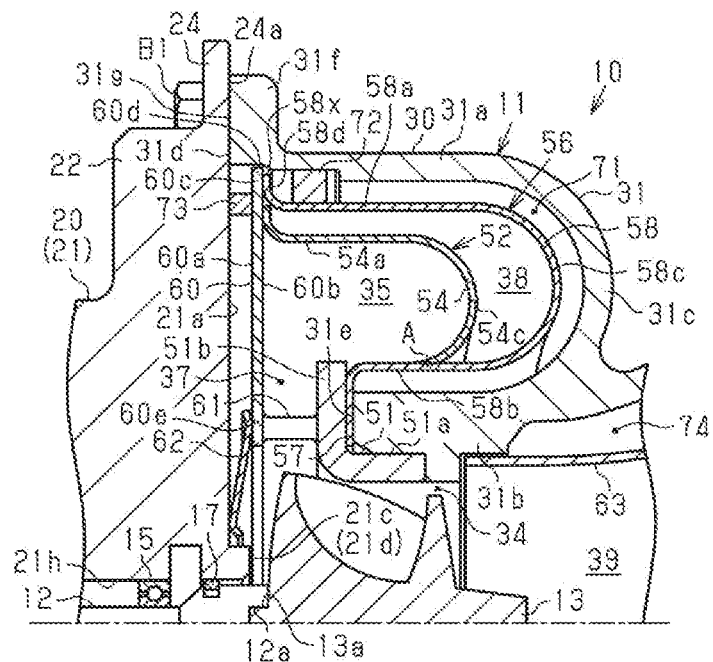
FIG. 8 is a side sectional view of an example of the turbocharger according to the present embodiment.

In the first scroll member 52 shown in FIG. 8, the first ring part 53 and the first inner peripheral portion 54b are omitted, as compared with the above-described embodiment. The shape of the second scroll member 56 shown in FIG. 8 is the same as the second scroll member 56 of the above-described embodiment. The turbocharger 10 has a welded portion A where an end of the first connecting portion 54c of the first scroll member 52 opposite from the first outer peripheral portion 54a and the second inner peripheral portion 58b of the second scroll member 56 are welded. The first scroll member 52 and the second scroll member 56 are integrated together with the welded portion A. The first scroll member 52 and the second scroll member 56 are supported by the turbine housing 30 with the second ring part 57 held between the end surface 31e of the turbine housing body portion 31 and the other end surface 512 of the ring portion 51b of the turbine shroud portion 51.

In this case, the first turbine scroll passage 35 is a space surrounded by the inner surface of the second inner peripheral portion 58b of the second scroll member 56, the inner surface of the first outer peripheral portion 54a, the inner surface of the first connecting portion 54c of the first scroll member 52, and the second end surface 60b of the passage forming plate 60. Since a part of the second scroll member 56 forms a part of the wall surface of the first turbine scroll passage 35, a part where the first scroll member 52 and the second scroll member 56 overlap is reduced, as compared with the above-described embodiment. As a result, the weight of the turbocharger 10 may be reduced. The connecting passage 38 is formed between the outer surface of the first outer peripheral portion 54a of the first scroll member 52 and the inner surface of the second outer peripheral portion 58a of the second scroll member 56, and between the outer surface of the first connecting portion 54c of the first scroll member 52 and the inner surface of the second connecting portion 58c of the second scroll member 56.

Figure 9:
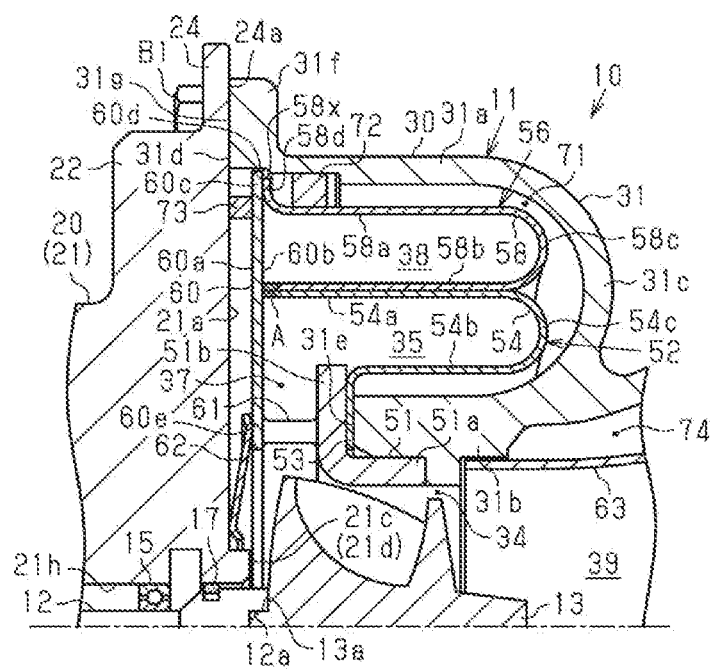
FIG. 9 is a side sectional view of an example of the turbocharger according to the present embodiment.

In the second scroll member 56 shown in FIG. 9, the second ring part 57 is omitted, and the length of the second outer peripheral portion 58a is the same as that of the second inner peripheral portion 58b in a half of the circumference in the circumferential direction of the impeller shaft 12. Although not shown in the illustration, the length of the second inner peripheral portion 58b is smaller than that of the second outer peripheral portion 58a in the remaining half of the circumference in the circumferential direction of the impeller shaft 12. In addition, the first rib 54d is omitted in the first scroll member 52 shown in FIG. 9, and the distance of the first outer peripheral portion 54a of the first passage forming part 54 from an end thereof opposite from the first connecting portion 54c to the first connecting portion 54c is the same as the distance of the second outer peripheral portion 58a of the second passage forming part 58 from an end thereof opposite from the second connecting portion 58c to the second connecting portion 58c. The turbocharger 10 has a welded portion A where an end of the first outer peripheral portion 54a of the first scroll member 52 opposite from the first connecting portion 54c and an end of the second inner peripheral portion 58b of the second scroll member 56 opposite from the second connecting portion 58c are welded. The first scroll member 52 and the second scroll member 56 are integrated together by the welded portion A.

The first passage forming part 54 of the first scroll member 52 and the second passage forming part 58 of the second scroll member 56 are arranged side by side in the radial direction of the impeller shaft 12, and accommodated in a space surrounded by the outer peripheral wall 31a, the inner peripheral wall 31b, and the connecting wall 31c of the turbine housing body portion 31. The first scroll member 52 is disposed inward of the second scroll member 56 in the radial direction of the impeller shaft 12. The first outer peripheral portion 54a of the first scroll member 52 and the second inner peripheral portion 58b of the second scroll member 56 overlap in the radial direction of the impeller shaft 12. The first scroll member 52 and the second scroll member 56 are supported by the turbine housing 30 with the first ring part 53 held between the end surface 31e of the turbine housing body portion 31 and the other end surface 512 of the ring portion 51b of the turbine shroud portion 51.

The first turbine scroll passage 35 is a space surrounded by the inner surface of the first outer peripheral portion 54a, the inner surface of the first inner peripheral portion 54b, the inner surface of the first connecting portion 54c of the first scroll member 52, and the part of the second end surface 60b of the passage forming plate 60 facing the first connecting portion 54c. The connecting passage 38 is a space surrounded by the inner surface of the second outer peripheral portion 58a, the inner surface of the second inner peripheral portion 58b, the inner surface of the second connecting portion 58c of the second scroll member 56, and the part of the second end surface 60b of the passage forming plate 60 facing the second connecting portion 58c. Although not shown in the illustration, the second turbine scroll passage 36 is a space surrounded by the inner surface of the second outer peripheral portion 58a, the inner surface of the second inner peripheral portion 58b, the inner surface of the second connecting portion 58c of the second scroll member 56, and the part of the second end surface 60b of the passage forming plate 60 facing the second connecting portion 58c. The second turbine scroll passage 36 is in communication with the communication passage 37 through a gap formed between the end of the second inner peripheral portion 58b where the length thereof is smaller than the second outer peripheral portion 58a and the second end surface 60b of the passage forming plate 60.

In the configuration shown in FIGS. 7 through 9, the first scroll member 52 and the second scroll member 56 are integrated by welding. As compared with the case where the first scroll member 52 and the second scroll member 56 are not integrally formed, the first scroll member 52 and the second scroll member 56 are more easily handled during the manufacture of the turbocharger 10.

Figure 10:
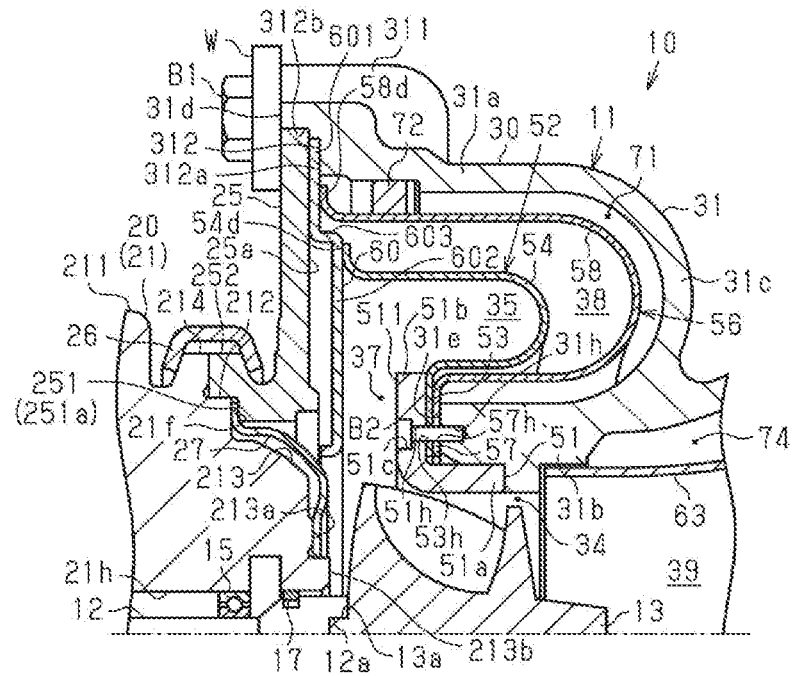
FIG. 10 is a side sectional view of an example of the turbocharger according to the present embodiment.
Figure 11:
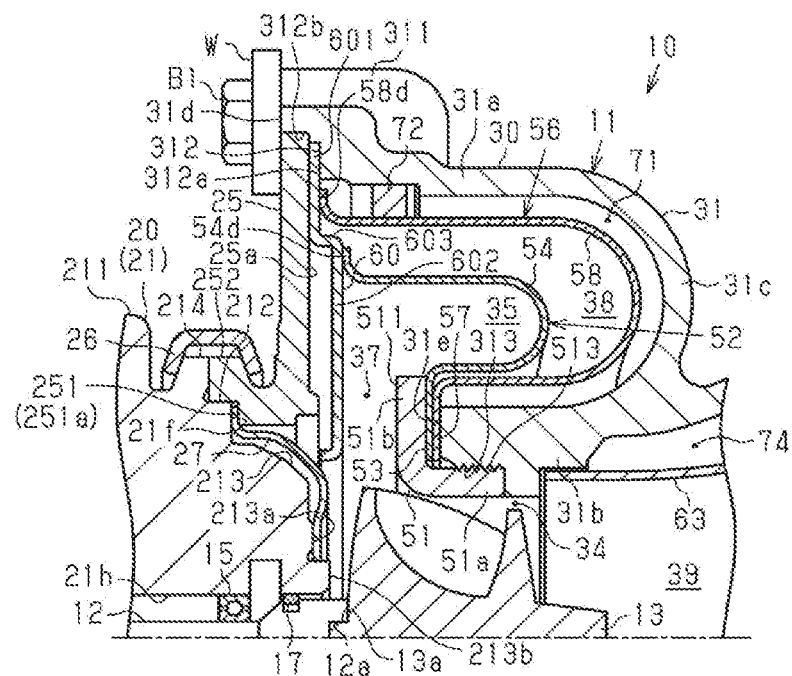
FIG. 11 is a side sectional view of an example of the turbocharger according to the present embodiment.

The structure for supporting the first scroll member 52 and the second scroll member 56 may be modified in a manner shown in FIGS. 10 and 11. The configuration of the bearing housing 20 and the turbine housing 30 will be described in detail in the following, but the description of the configuration the same as the above embodiment will be omitted. In addition, although the shapes of the first scroll member 52 and the second scroll member 56 are the same as those of the above-described embodiment in FIGS. 10 and 11, the first scroll member 52 and the second scroll member 56 may have the shapes shown in FIGS. 6 through 9.

As shown in FIGS. 10 and 11, the bearing housing body portion 21 of the bearing housing 20 has a large diameter portion 211, and a small diameter portion 212 that is continuous with one end of the large diameter portion 211 in the rotation axis direction of the impeller shaft 12. The outer diameter of the small diameter portion 212 is smaller that of the large diameter portion 211. The small diameter portion 212 is located adjacently to the turbine housing 30 in the rotation axis direction of the impeller shaft 12. The bearing housing body portion 21 has a projected portion 213 having a tubular shape and projecting from an small diameter side end surface 21*f* of the small diameter portion 212 in the rotation axis direction of the impeller shaft 12. The projected portion 213 is formed so that the diameter of the projected portion 213 reduces as away from the small diameter portion 212 in the rotation axis direction of the impeller shaft 12. The insertion hole 21*h* is opened at the end surface 213*a* of the projected portion 213. The C-ring 17, which serves as a sealing member, is interposed between the inner peripheral surface of the insertion hole 21*h* of the projected portion 213 and the outer peripheral surface of the impeller shaft 12. A projection 213*b* having an annular shape is formed projecting from the end surface 213*a* of the projected portion 213 around the insertion hole 21*h* in the end surface 213*a* of the projected portion 213. The bearing housing 20 has a annular connecting flange 214 having a ring shape that projects outwardly in the radial direction of the impeller shaft 12 from the outer peripheral surface of the small diameter portion 212.

The turbine housing body portion 31 of the turbine housing 30 has a connecting projection 311 projecting outwardly in the radial direction of the impeller shaft 12 from an end of the outer peripheral surface of the outer peripheral wall 31*a* adjacent to the bearing housing 20. The turbine housing body portion 31 has a groove portion 312 recessed in the inner peripheral portion of the end surface 31*d*. The groove portion 312 is opened at the inner peripheral surface of the outer peripheral wall 31*a*. The groove portion 312 includes an inner bottom surface 312*a* extending in the radial direction of the impeller shaft 12, and an inner peripheral surface 312*b* extending in the rotation axis direction of the impeller shaft 12.

The bearing housing 20 has a closing plate 25 that has a ring shape and covers the opening of the turbine housing body portion 31. The closing plate 25 has a standing portion 251 having a ring shape that stands from the inner peripheral edge of the closing plate 25 toward the bearing housing 20, and a connecting protrusion 252 projecting from the outer peripheral edge of an end surface 251*a* of the standing portion 251 in the radial direction of the impeller shaft 12.

The passage forming plate 60 is disposed between the closing plate 25 and the first scroll member 52 and between the closing plate 25 and the second scroll member 56 in the rotation axis direction of the impeller shaft 12. The passage forming plate 60 includes an outer peripheral plate portion 601, an inner peripheral plate portion 602, and a connecting plate 603 connecting the inner peripheral edge of the outer peripheral plate portion 601 and the outer peripheral edge of the inner peripheral plate portion 602. The outer peripheral plate portion 601 and the inner peripheral plate portion 602 extend in the radial direction of the impeller shaft 12. One end surface of the outer peripheral plate portion 601 is in contact with one end surface 25*a* of the closing plate 25 on the side thereof adjacent to the turbine housing body portion 31. The other end surface of the outer peripheral plate portion 601 is in contact with the second rib 58*d*. A large part of the one end surface of the inner peripheral plate portion 602 faces the one end surface 25*a* of the closing plate 25 in a state that the large part of the one end surface of the inner peripheral plate portion 602 is spaced from the one end surface 25*a*. A radially inner part of the other end surface of the inner peripheral plate portion 602 faces the ring portion 51*b* of the turbine shroud portion 51, and a radially outer part of the other end surface of the inner peripheral plate portion 602 faces the first passage forming part 54 of the first scroll member 52. In addition, the part of the other end surface of the inner peripheral plate portion 602 that forms the radially outer end is in contact with the first rib 54*d*.

The closing plate 25 is connected to the bearing housing body portion 21 with the connecting flange 214 of the bearing housing body portion 21 of the bearing housing 20 and the connecting protrusion 252 of the closing plate 25 held by the fastening force of the clamping member 26. With the closing plate 25 connected to the bearing housing 20, the closing plate 25 is located so as to surround the projected portion 213 of the bearing housing 20.

A cover member 27 is disposed between n outer surface of the projected portion 213 of the bearing housing 20 and an inner peripheral surface of the closing plate 25 in the radial direction of the impeller shaft 12. The cover member 27 is a heat insulator. The cover member 27 has a shape that extends along the outer surface of the projected portion 213 of the bearing housing 20 and is disposed spaced from the outer surface of the projected portion 213. An inner peripheral portion of the cover member 27 is fixed to the end surface 213*a* of the projected portion 213, and an inner peripheral edge of the cover member 27 faces the outer peripheral surface of the projection 213*b* in the radial direction of the impeller shaft 12. The outer peripheral portion of the cover member 27 is held between the small diameter side end surface 21*f* of the bearing housing body portion 21 and the end surface 251*a* of the standing portion 251. The outer peripheral edge of the cover member 27 faces the inner peripheral surface of the connecting protrusion 252.

The outer peripheral end portion of the closing plate 25 and the radially outer end portion of the outer peripheral plate portion 601 are disposed between the inner bottom surface 312*a* of the groove portion 312 of the turbine housing body portion 31 and the washer W in the rotation axis direction of the impeller shaft 12. The one end surface of the closing plate 25 on the turbine housing 30 side is in contact with the one end surface of the outer peripheral plate portion 601 of the passage forming plate 60. The other end surface of the closing plate 25 on the side opposite from the turbine housing 30 is in contact with the washer W. A surface of the washer W facing the closing plate 25 is in contact with the end surface 31*d* of the turbine housing body portion 31. The other end surface of the outer peripheral plate portion 601 of the passage forming plate 60 opposite from the closing plate 25 is in contact with the inner bottom surface 312*a* of the groove portion 312. The outer peripheral edge of the closing plate 25 and the outer peripheral edge of the outer peripheral plate portion 601 face the inner peripheral surface 312*b* of the groove portion 312. A mounting bolt B2 is inserted through the washer W and screwed into the connecting projection 311 of the outer peripheral wall 31*a* with the closing plate 25 and the outer peripheral plate portion 601 of the passage forming plate 60 disposed between the turbine housing body portion 31 and the washer W.

The outer peripheral part of the closing plate 25 and the radially outer end portion of the outer peripheral plate portion 601 of the passage forming plate 60 are held between the washer W and the turbine housing body portion 31 in the rotation axis direction of the impeller shaft 12. Thus, the closing plate 25 and the turbine housing body portion 31 are connected, thereby connecting the turbine housing 30 to the one end of the bearing housing 20 in the rotation axis direction of the impeller shaft 12. The passage forming plate 60 is supported by the bearing housing 20 and the turbine housing 30.

As shown in FIG. 10, the turbine shroud portion 51 may be connected to the inner peripheral wall 31b of the turbine housing body portion 31 by the mounting bolt B2 with the first ring part 53 and the second ring part 57 disposed between the end surface 31e of the turbine housing body portion 31 and the other end surface 512 of the ring portion 51b of the turbine shroud portion 51. Specifically, the ring portion 51b of the turbine shroud portion 51 has a mounting hole 51h through which the shaft portion of the mounting bolt B2 may be inserted, and a recessed portion 51c that is recessed in one end surface 511. The mounting hole 51h is opened at the bottom surface of the recessed portion 51c. In addition, the first ring part 53 and the second ring part 57 have mounting holes 53h and 57h, respectively, through which the shaft portion of the mounting bolt B2 may be inserted. Further, a mounting portion 31h is formed in the inner peripheral wall 31b of the turbine housing body portion 31. The mounting bolt B2 may be screwed into the mounting portion 31h. The mounting bolt B2 is inserted through the mounting hole 51h of the ring portion 5b, the mounting hole 53h of the first ring part 53, the mounting hole 57h of the second ring part 57, and screwed into the mounting portion 31h of the inner peripheral wall 31b. Since the head of the mounting bolt B2 is received in the recessed portion 51c, the mounting bolt B2 is not projected out from the one end surface 511 of the ring portion 51b.

In this case, the first ring part 53 and the second ring part 57 are held between the ring portion 51b of the turbine shroud portion 51 and the inner peripheral wall 31b of the turbine housing body portion 31 with axial force caused by screwing the mounting bolt B2 acting on the ring portion 51b of the turbine shroud portion 51, with the result that the first ring part 53 and the second ring part 57 are supported by the turbine housing 30. Thus, the ring portion 51b need not be urged toward the turbine housing body portion 31 by, for example, the plate spring 62. In addition, the spacers 61 for securing a space between the passage forming plate 60 and the ring portion 51b of the turbine shroud portion 51 may be omitted. As a result, the configuration of the turbocharger 10 may be simplified.

As shown in FIG. 11, the turbocharger 10 may include an external threaded portion 513 formed in the outer peripheral surface of the tubular portion 51a of the turbine shroud portion 51, and an internal threaded portion 313 formed in the surface of the inner peripheral wall 31b of the turbine housing body portion 31 opposite from the outer peripheral wall 31a. The turbine shroud portion 51 is connected to the turbine housing 30 by screwing the external threaded portion 513 of the tubular portion 51a into the internal threaded portion 313 of the inner peripheral wall 31b with the first ring part 53 and the second ring part 57 disposed between the end surface 31e of the turbine housing body portion 31 and the other end surface 512 of the ring portion 51b of the turbine shroud portion 51.

In this case, the first ring part 53 and the second ring part 57 are held between the ring portion 51b of the turbine shroud portion 51 and the inner peripheral wall 31b of the turbine housing body portion 31 with axial force caused by screwing the tubular portion 51a of the turbine shroud portion 51, with the result that the first ring part 53 and the second ring part 57 are supported by the turbine housing 30. Thus, the ring portion 51b need not be urged toward the turbine housing body portion 31 by, for example, the plate spring 62. In addition, the spacers 61 for securing a space between the passage forming plate 60 and the ring portion 51b of the turbine shroud portion 51 may be omitted. As a result, the configuration of the turbocharger 10 may be simplified.

Figure 12:
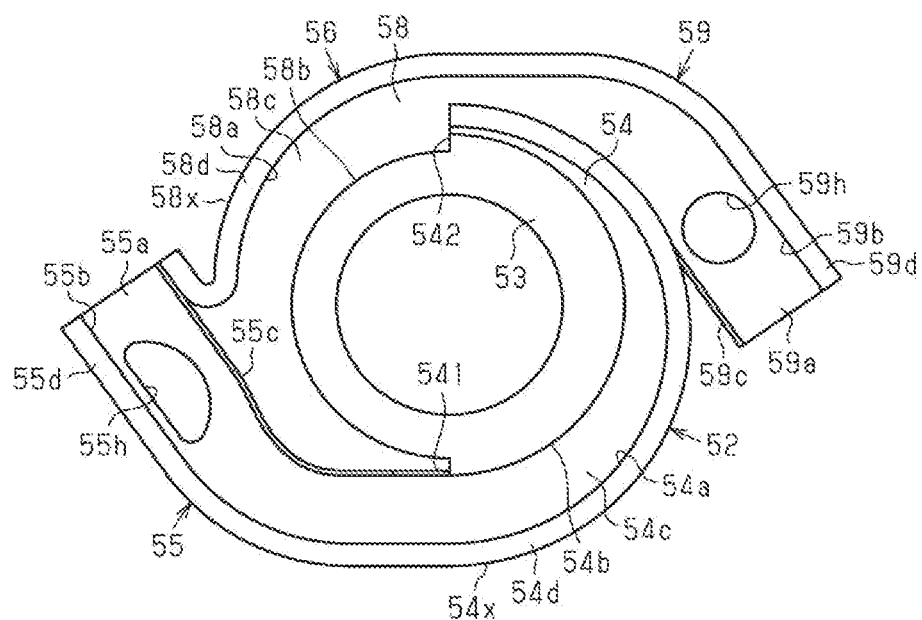
FIG. 12 is a plan view showing examples of a first scroll member and a second scroll member.

As shown in FIG. 12, the end of the second inlet port forming member 59 opposite from the second passage forming part 58 may be disposed at a position about 180 degree shifted relative to the end of the first inlet port forming member 55 opposite from the first passage forming part 54 in the circumferential direction of the first ring part 53 and the second ring part 57. In other words, the dimension of the second inlet port 33b may be reduced. In this case, the connecting passage 38 is not formed, and the second inlet port 33b directly communicates with the second turbine scroll passage 36.

The structure for supporting the first scroll member 52 and the second scroll member 56 may be modified as follows.

For example, the first scroll member 52 is supported by holding the first ring part 53 between the end surface 31e of the turbine housing body portion 31 and the other end surface 512 of the tubular portion 51a of the turbine shroud portion 51. The second scroll member 56 may be modified so that the length of the second rib 58d is increased outwardly in the radial direction of the impeller shaft 12, and the second ring part 57 is omitted, as compared with the above-described embodiment. Thus, the second scroll member 56 is supported with the second rib 58d held by the bearing housing 20 and the end surface 31d of the turbine housing body portion 31. It is noted that the second rib 58d may be held with or without the passage forming plate 60 by the bearing housing 20 and the end surface 31d of the turbine housing body portion 31.

In a configuration in which both the first ring part 53 of the first scroll member 52 and the second ring part 57 of the second scroll member 56 are held by the turbine housing body portion 31 and the turbine shroud portion 51, a gap between the turbine impeller 13 and the turbine shroud portion 51 is set in consideration with dimensional tolerance for the first ring part 53 and the second ring part 57 in the thickness direction thereof. On the other hand, in a configuration in which only the first ring part 53 of the first scroll member 52 is held by the turbine housing body portion 31 and the turbine shroud portion 51, a gap between the turbine impeller 13 and the turbine shroud portion 51 is set in consideration with dimensional tolerance for the first ring part 53 in the thickness direction thereof. In other words, the gap between the turbine impeller 13 and the turbine shroud portion 51 may be set without considering the dimensional tolerance of the second ring part 57. Therefore, the dimensional tolerance for the gap between the turbine impeller 13 and the turbine shroud portion 51 may be reduced, thereby improving the performance of the turbocharger 10.

In the above configuration, the end portion of the second inner peripheral portion 58b opposite from the second connecting portion 58c is an inner peripheral end portion of the second scroll member 56 and a free end. The tip of the end portion of the second inner peripheral portion 58b opposite from the second connecting portion 58c is a free end edge portion, and the turbine shroud portion 51 is a facing member that faces the tip of the end portion of the second inner peripheral portion 58b opposite from the second connecting portion 58c. The tip of the end portion of the second inner peripheral portion 58b opposite from the second connecting portion 58c faces the turbine shroud portion 51 with the tip of the end portion of the second inner peripheral portion 58b spaced from the turbine shroud portion 51.

It is noted that the second inner peripheral portion 58b may be disposed so that the inner surface of the second inner peripheral portion 58b is in contact with the first inner peripheral portion 54b of the first scroll member 52, and the outer surface of the second inner peripheral portion 58b is in contact with the inner peripheral wall 31b of the turbine housing body portion 31. "The inner peripheral end portion of the second scroll member 56 being a free end" includes a state that the inner peripheral end portion is in contact with the surrounding parts, but slidable thereon, and the heat expansion of the second scroll member 56 in the radially inward side of the second scroll member 56 is not hindered.

The structure for supporting the first scroll member 52 and the second scroll member 56 may be modified as follows.

For example, the second scroll member 56 is supported by holding the second ring part 57 between the end surface 31e of the turbine housing body portion 31 and the other end surface 512 of the tubular portion 51a of the turbine shroud portion 51. The first scroll member 52 may be modified so that the length of the first rib 54d is increased outwardly in the radial direction of the impeller shaft 12 and the first ring part 53 is omitted, as compared with the above-described embodiment. Thus, the first scroll member 52 is supported with the first rib 54d held by the bearing housing 20 and the end surface 31d of the turbine housing body portion 31. It is noted that the first rib 54d may be held with or without the passage forming plate 60 by the bearing housing 20 and the end surface 31d of the turbine housing body portion 31.

In this case, since only the second ring part 57 of the second scroll member 56 is held by the turbine housing body portion 31 and the turbine shroud portion 51, a gap between the turbine impeller 13 and the turbine shroud portion 51 is set in consideration with dimensional tolerance of the second ring part 57 in the thickness direction thereof. In other words, the gap between the turbine impeller 13 and the turbine shroud portion 51 may be set without considering the dimensional tolerance for the first ring part 53 in the thickness direction thereof. Therefore, the dimensional tolerance for the gap between the turbine impeller 13 and the turbine shroud portion 51 may be reduced, thereby improving the performance of the turbocharger 10.

In this configuration, the end portion of the first inner peripheral portion 54b opposite from the first connecting portion 54c is an inner peripheral end portion of the first scroll member 52 and a free end. A tip of the end portion of the first inner peripheral portion 54b opposite from the first connecting portion 54c is a free end edge portion, and the passage forming plate 60 is a facing member that faces a tip of the end portion of the first inner peripheral portion 54b opposite from the first connecting portion 54c. The tip of the end portion of the first inner peripheral portion 54b opposite from the first connecting portion 54c faces the second end surface 60b of the passage forming plate 60 with the tip of the end portion of the first inner peripheral portion 54b spaced from the second end surface 60b of the passage forming plate 60.

The outer surface of the first inner peripheral portion 54b may be in contact with the inner surface of the second inner peripheral portion 58b of the second scroll member 56. "The inner peripheral end portion of the first scroll member 52 being a free end" includes a state that the inner peripheral end portion is in contact with the surrounding parts, but slidable thereon, and the heat expansion of the first scroll member 52 in the radially inward side of the first scroll member 52 is not hindered.

The structure for supporting the first scroll member 52 and the second scroll member 56 may be modified as follows.

For example, the first scroll member 52 is modified so that the length of the first rib 54d is increased outwardly in the radial direction of the impeller shaft 12 and the first ring part 53 is omitted, as compared with the above-described embodiment. The second scroll member 56 is modified so that the second rib 58d extend outwardly in the radial direction of the impeller shaft 12 and the second ring part 57 is omitted, as compared with the above described embodiment. The first rib 54d and the second rib 58d are held by the bearing housing 20 and the end surface 31d of the turbine housing body portion 31 with the first rib 54d and the second rib 58d overlapped in the rotation axis direction of the impeller shaft 12, thereby supporting the first scroll member 52 and the second scroll member 56.

In this configuration, the end portion of the second inner peripheral portion 58b opposite from the second connecting portion 58c is an inner peripheral end portion of the second scroll member 56 and a free end. The tip of the end portion of the second inner peripheral portion 58b opposite from the second connecting portion 58c is a free end edge portion, and the turbine shroud portion 51 is a facing member that faces the tip of the end portion of the second inner peripheral portion 58b opposite from the second connecting portion 58c. The tip of the end portion of the second inner peripheral portion 58b opposite from the second connecting portion 58c faces the turbine shroud portion 51 with the tip of the end portion of the second inner peripheral portion 58b spaced from the turbine shroud portion 51.

The end portion of the first inner peripheral portion 54b opposite from the first connecting portion 54c is an inner peripheral end portion of the first scroll member 52, and a free end. A tip of the end portion of the first inner peripheral portion 54b opposite from the first connecting portion 54c is a free end edge portion, and the passage forming plate 60 is a facing member that faces a tip of the end portion of the first inner peripheral portion 54b opposite from the first connecting portion 54c. The tip of the end portion of the first inner peripheral portion 54b opposite from the first connecting portion 54c faces the second end surface 60b of the passage forming plate 60 with the tip of the end portion of the first inner peripheral portion 54b spaced from the second end surface 60b of the passage forming plate 60.

If the first scroll member 52 may be formed by the pressing, the distance from the first outer peripheral portion 54a to the first inner peripheral portion 54b in the radial direction of the first ring part 53 need not be constant in the rotation axis direction of the impeller shaft 12, The distance from the first outer peripheral portion 54a to the first inner peripheral portion 54b in the radial direction of the first ring part 53 may be increased from the first connecting portion 54c toward the opening. That is, the first scroll member 52 may have a shape in which the diameter of the opening increases from the first connecting portion 54c to the opening in the rotation axis direction of the impeller shaft 12.

Similarly, if the second scroll member 56 may be formed by pressing, the distance from the second outer peripheral portion 58a to the second inner peripheral portion 58b in the radial direction of the second ring part 57 need not be constant in the rotation axis direction of the impeller shaft 12. The distance from the second outer peripheral portion 58a to the second inner peripheral portion 58b in the radial direction of the second ring part 57 may be increased from the second connecting portion 58c toward the opening. That is, the second scroll member 56 has a shape that the diameter of the opening increases from the second connecting portion 58c to the opening in the rotation axis direction of the impeller shaft 12.

The turbocharger 10 may include a plurality of fixed vanes that is fixed to the turbine shroud portion 51. The fixed vanes are spaced from each other in the circumferential direction of the communication passage 37. In this case, the fixed vanes maintain the distance between the one end surface 511 of the ring portion 51b of the turbine shroud portion 51 and the second end surface 60b of the passage forming plate 60 in the rotation axis direction of the impeller shaft 12, so that the spacers 61 may be omitted.

The turbocharger 10 may include a plurality of variable vanes that are rotatably supported by the turbine shroud portion 51 and the passage forming plate 60, and a plurality of link members that drives the variable vanes. The variable vanes and the link members are spaced from each other, respectively, in the circumferential direction of the communication passage 37. The variable vanes are disposed between the passage forming plate 60 and the turbine shroud portion 51 in the rotation axis direction of the impeller shaft 12. The link members are disposed between the passage forming plate 60 and the bearing housing body portion 21 of the bearing housing 20 in the rotation axis direction of the impeller shaft 12. Each of the link members drives its associated variable vane so as to change the angular position of the vane relative to the ring portion 51b, thereby changing the cross sectional area of the communication passage 37. The flow rate of exhaust gas introduced to the turbine chamber 34 may be adjusted by changing the cross sectional area of the communication passage 37.

In the turbocharger 10, the passage forming plate may be omitted, and the openings of the first scroll member 52 and the second scroll member 56 may be covered by the bearing housing 20. In this case, the bearing housing 20 serves as a closing member. The one end surface 21a of the bearing housing body portion 21 of the bearing housing 20 forms a wall surfaces of the first turbine scroll passage 35, the second turbine scroll passage 36, and the connecting passage 38 on the bearing housing 20 side.

The gap S3 between the first outer peripheral portion 54a of the first passage forming part 54 and the second outer peripheral portion 58a of the second passage forming part 58 may be covered by the first rib 54d of the first passage forming part 54 of the first scroll member 52. In this case, the connecting passage 38 is a space surrounded by the outer surface of the first passage forming part 54, the inner surface of the second passage forming part 58, and the surface of the first rib 54d on the first connecting portion 54c side.

The first rib 54d of the first passage forming part 54 of the first scroll member 52 may be disposed so that the first rib 54d is spaced from the outer peripheral end portion 60c of the passage forming plate 60. The first rib 54d may be in contact with the surrounding parts of the first scroll member 52 on the side opposite from the outer peripheral end portion 60c of the passage forming plate 60. The first rib 54d of the first passage forming part 54 of the first scroll member 52 shown in FIGS. 10 and 11 may be spaced from the outer peripheral plate portion 601 of the passage forming plate 60. On the opposite side from the outer peripheral plate portion 601 of the passage forming plate 60, the first rib 54d may be in contact with the surrounding parts of the first scroll member 52.

"The outer peripheral end portion of the first scroll member 52 being an free end" includes a state that the outer peripheral end portion is in contact with the surrounding parts but is slidable thereon, and the heat expansion of the first scroll member 52 in the radially outer side of the first scroll member 52 is not hindered.

The second rib 58d of the second passage forming part 58 of the second scroll member 56 may be disposed so that the second rib 58d is spaced from the outer peripheral end portion 60c of the passage forming plate 60. The second rib 58d may be in contact with parts disposed around the second scroll member 56 on the side opposite from the outer peripheral end portion 60c of the passage forming plate 60.

"The outer peripheral end portion of the second scroll member 56 being an free end" includes a state that the outer peripheral end portion is in contact with the surrounding parts but is slidable thereon, and the heat expansion of the second scroll member 56 in the radially inward side of the second scroll member 56 is not hindered.

The first elastic member 72 interposed between the outer peripheral wall 31a of the turbine housing body portion 31 and the second outer peripheral portion 58a of the second passage forming part 58 of the second scroll member 56 in the radial direction of the impeller shaft 12 may be omitted.

The first elastic member 72 need not be provided by a mesh wire, but by other elastic members.

The method for fixing the first elastic member 72 to the second outer peripheral portion 58a of the second passage forming part 58 is not limited to micro spot welding. For example, the first elastic member 72 may be fixed to the second outer peripheral portion 58a of the second passage forming part 58 by adhesion using adhesive or riveting.

The second elastic member 73 interposed between the first end surface 60a of the passage forming plate 60 and the one end surface 21a of the bearing housing body portion 21 of the bearing housing 20 in the rotation axis direction of the impeller shaft 12 may be omitted.

The second elastic member 73 need not necessarily be provided by a wire mesh but by other elastic members.

The method for fixing the second elastic member 73 to the first end surface 60a of the passage forming plate 60 is not limited to micro spot welding. For example, the second elastic member 73 may be fixed to the first end surface 60a of the passage forming plate 60 by adhesion using adhesive or riveting.

The turbine shroud portion 51 need not necessarily be provided separately from the turbine housing 30, but may be formed integrally with the turbine housing 30. In this case, the wall surface of the communication passage 37 opposite from the bearing housing 20 is formed by the turbine housing 30.

The first inlet port forming member 55 need not necessarily be formed integrally with the first scroll member 52, but may be formed separately from the first scroll member 52.

The second inlet port forming member 59 need not necessarily be formed integrally with the second scroll member 56, but may be formed separately from the second scroll member 56.

The internal combustion engine E may be provided by a gasoline engine or a diesel engine. The internal combustion engine E is not limited to a four-cylinder engine, but may be a six-cylinder engine. The arrangement of the cylinders in the internal combustion engine is not limited to an in-line arrangement, but may be a V-shape arrangement.

The materials for the bearing housing 20, the turbine housing 30, and the compressor housing 40 are not limited to cast iron, but may be a cast steel.

What is claimed is:

1. A turbocharger comprising:
a housing including a bearing housing that rotatably supports an impeller shaft, and a turbine housing that is connected to one end of the bearing housing in a rotation axis direction of the impeller shaft and in which exhaust gas discharged from an internal combustion engine flows;
a first inlet port through which the exhaust gas flows into the turbine housing;
a second inlet port through which the exhaust gas flows into the turbine housing;
a turbine chamber formed in the turbine housing;
a turbine impeller accommodated in the turbine chamber, and rotating integrally with the impeller shaft by the exhaust gas flowing into the turbine chamber;
a first turbine scroll passage that is formed in the turbine housing around a part of an outer periphery of the turbine chamber, and through which the exhaust gas flowing into the turbine housing through the first inlet port is introduced to the turbine chamber;
a second turbine scroll passage that is formed in the turbine chamber around a part of the outer periphery of the turbine chamber and through which the exhaust gas flowing into the turbine housing through the second inlet port is introduced to the turbine chamber; and
a communication passage having an annular shape that is formed in the turbine housing and provides communication between the first turbine scroll passage and the turbine chamber and between the second scroll passage and the turbine chamber,
wherein the turbocharger has a twin entry scroll structure in which the second turbine scroll passage communicates with the turbine chamber through a part of the communication passage that is different from a part of the communication passage through which the first turbine scroll passage communicates with the turbine chamber in the circumferential direction of the impeller shaft, wherein
the turbocharger includes:
a first scroll member made of sheet metal, extending in a circumferential direction of the impeller shaft, having an opening that is opened to the bearing housing, and forming a part of a wall surface of the first turbine scroll passage;
a second scroll member made of sheet metal, extending in the circumferential direction of the impeller shaft, having an opening that is opened to the bearing housing, and forming a part of a wall surface of the second turbine scroll passage; and
a closing member closing the opening of the first scroll member and forming the wall surface of the first turbine scroll passage on the side thereof adjacent to the bearing housing, and closing the opening of the second scroll member and forming the wall surface of the second turbine scroll passage on the side thereof adjacent to the bearing housing, wherein
the first scroll member includes a first passage forming part,
the second scroll member includes a second passage forming part having an annular shape, the second passage forming part including a second outer peripheral portion, a second inner peripheral portion located inward of the second outer peripheral portion, and a second connecting portion, and
the first passage forming part is disposed in a space surrounded by the second outer peripheral portion, the second inner peripheral portion, and the second connecting portion.

2. The turbocharger according to claim 1, wherein
the first passage forming part extends in the circumferential direction of the impeller shaft in a part of an entire circumference, the first passage forming part includes a first outer peripheral portion, a first inner peripheral portion located inward of the first outer peripheral portion, and a first connecting portion connecting the first outer peripheral portion and the first inner peripheral portion in a radial direction of the impeller shaft, and
the second connecting portion connects the second outer peripheral portion and the second inner peripheral portion in the radial direction of the impeller shaft.

3. The turbocharger according to claim 2, wherein
the turbocharger includes a connecting passage that is formed in the turbine housing and provides communication between the second inlet port and the second turbine scroll passage, and
the connecting passage is formed between an outer surface of the first passage forming part and an inner surface of the second passage forming part, and is disposed side by side with the first turbine scroll passage in the rotation axis direction of the impeller shaft.

4. The turbocharger according to claim 2, wherein
the first scroll member and the second scroll member are supported by the housing.

5. The turbocharger according to claim 1, wherein
the first scroll member has a free end in one of an inner peripheral end portion and an outer peripheral end portion of the first scroll member, and an edge portion of the first scroll member on the free end side has a free end edge portion that is spaced from a facing member facing the free end edge portion of the first scroll member, and
the second scroll member has a free end in one of an inner peripheral end portion and an outer peripheral portion of the second scroll member, and an edge portion of the second scroll member on the free end side has a free end edge portion that is spaced from a facing member facing the free end edge portion of the second scroll member.

6. The turbocharger according to claim 1, wherein
the first scroll member and the second scroll member are integrated by a welding portion.

7. The turbocharger according to claim 1, wherein
the turbocharger includes a turbine shroud portion having a ring portion that forms a wall surface of the communication passage on a side opposite from the bearing housing, and
the turbine shroud portion is connected to the turbine housing with a bolt with at least one of a part of the first scroll member and a part of the second scroll member located between the ring portion and the turbine housing.

8. The turbocharger according to claim 1, wherein
the turbocharger includes a turbine shroud portion that includes a tubular portion, and a ring portion, the tubular portion having a threaded portion in an outer peripheral surface facing the turbine housing, and the ring portion being continuous with the tubular portion and forming a wall surface of the communication passage on a side opposite from the bearing housing, and
the turbine shroud portion is connected to the turbine housing by screwing the threaded portion of the tubular portion into a threaded portion formed in the turbine housing with at least one of a part of the first scroll member and a part of the second scroll member located between the ring portion and the turbine housing.

\* \* \* \* \*